(12) United States Patent
Heil et al.

(10) Patent No.: US 8,847,475 B2
(45) Date of Patent: Sep. 30, 2014

(54) LAMP FOR REPLACING A FLUORESCENT TUBE

(75) Inventors: Volker Heil, Oberhausen (DE); Rasit Oezguec, Dinslaken (DE); Udo Piontek, Bottrop (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/696,414

(22) PCT Filed: Apr. 13, 2011

(86) PCT No.: PCT/EP2011/055821
§ 371 (c)(1),
(2), (4) Date: Jan. 14, 2013

(87) PCT Pub. No.: WO2011/138141
PCT Pub. Date: Nov. 10, 2011

(65) Prior Publication Data
US 2013/0127327 A1 May 23, 2013

(30) Foreign Application Priority Data

May 7, 2010 (DE) .......... 10 2010 019 875
Aug. 26, 2010 (DE) .......... 10 2010 035 624
Dec. 10, 2010 (DE) .......... 10 2010 054 133

(51) Int. Cl.
| | | |
|---|---|---|
| H01J 1/52 | (2006.01) | |
| H01J 19/40 | (2006.01) | |
| H05B 33/08 | (2006.01) | |
| F21V 25/04 | (2006.01) | |
| H01R 33/08 | (2006.01) | |
| F21K 99/00 | (2010.01) | |
| F21Y 105/00 | (2006.01) | |
| F21Y 101/02 | (2006.01) | |
| H01R 33/96 | (2006.01) | |

(52) U.S. Cl.
CPC ............ *H01J 1/52* (2013.01); *F21Y 2105/001* (2013.01); *Y02B 20/341* (2013.01); *H05B 33/0809* (2013.01); *F21V 25/04* (2013.01); *H01R 33/08* (2013.01); *Y02B 20/386* (2013.01); *F21K 9/175* (2013.01); *H01R 33/0836* (2013.01); *F21Y 2101/02* (2013.01); *H01R 33/96* (2013.01)
USPC ............ 313/313; 315/61; 315/32; 174/140 R; 174/145

(58) Field of Classification Search
USPC .......... 313/313, 239, 326; 315/32, 58, 85, 61; 174/140 R, 142, 145
See application file for complete search history.

(56) References Cited

U.S. PATENT DOCUMENTS 3,685,003 A * 8/1972 Watt .............................. 439/237
5,412,550 A * 5/1995 Hsieh et al. ................... 362/641

(Continued)

FOREIGN PATENT DOCUMENTS

| CN | 201672283 U | 12/2010 |
|---|---|---|
| EP | 2366948 A2 | 9/2011 |

(Continued)

*Primary Examiner* — Jose M Diaz
(74) *Attorney, Agent, or Firm* — The Webb Law Firm

(57) ABSTRACT

A lamp with a light-emitting unit, at least two separate contact modules and an electrical connection between the light-emitting unit and the contact modules, wherein each contact module has at least one electrical contact for connecting to a corresponding lampholder, is presented and described. So that other lamps can be operated safely as gas-discharge lamps in lampholders provided for them, it is envisaged that at least one protective device for prevention of electric shock is provided on at least one of the electrical contacts in a partially assembled state of the lamp in a corresponding lampholder, and that the protective device is designed to assume a deactivated position in the assembled state of the lamp and an activated position in the dismantled state of the lamp.

19 Claims, 17 Drawing Sheets

(56) References Cited

U.S. PATENT DOCUMENTS

| | | | |
|---|---|---|---|
| 5,752,842 A * | 5/1998 | Friederichs et al. | 439/152 |
| 7,530,833 B1 * | 5/2009 | Yang | 439/337 |
| 8,147,091 B2 * | 4/2012 | Hsia et al. | 362/221 |
| 8,459,831 B2 * | 6/2013 | Hsia et al. | 362/221 |
| 2010/0289419 A1 * | 11/2010 | Rudolph | 315/223 |
| 2011/0149563 A1 * | 6/2011 | Hsia et al. | 362/221 |
| 2011/0176297 A1 * | 7/2011 | Hsia et al. | 362/217.1 |
| 2012/0043892 A1 * | 2/2012 | Visser et al. | 315/121 |

FOREIGN PATENT DOCUMENTS

| | | |
|---|---|---|
| GB | 2111767 A | 7/1983 |
| GB | 2319901 A | 6/1998 |
| JP | 2010192229 A | 9/2010 |
| WO | 03043141 A1 | 5/2003 |
| WO | 2007015274 A1 | 2/2007 |
| WO | 2007072581 A1 | 6/2007 |
| WO | 2009067074 A1 | 5/2009 |
| WO | 2010069983 A1 | 6/2010 |
| WO | 2011124683 A1 | 10/2011 |

* cited by examiner

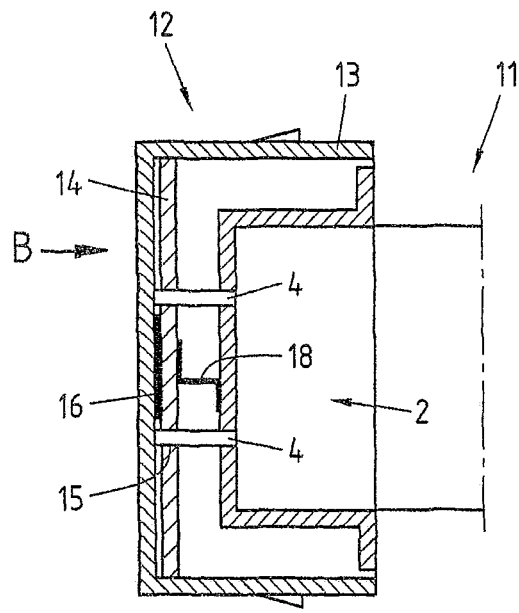
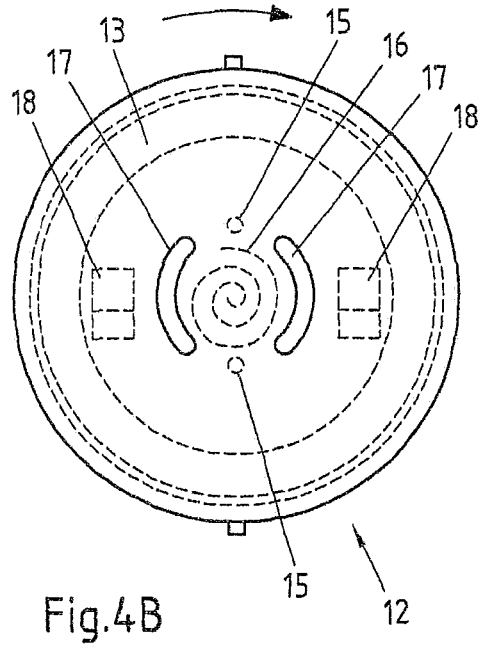
Fig.4A    Fig.4B
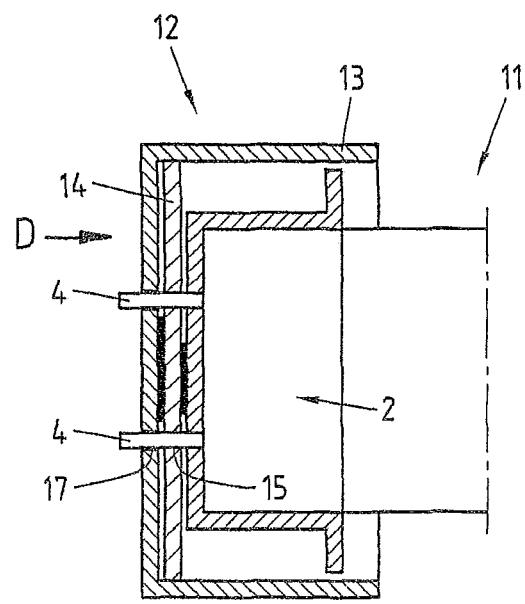
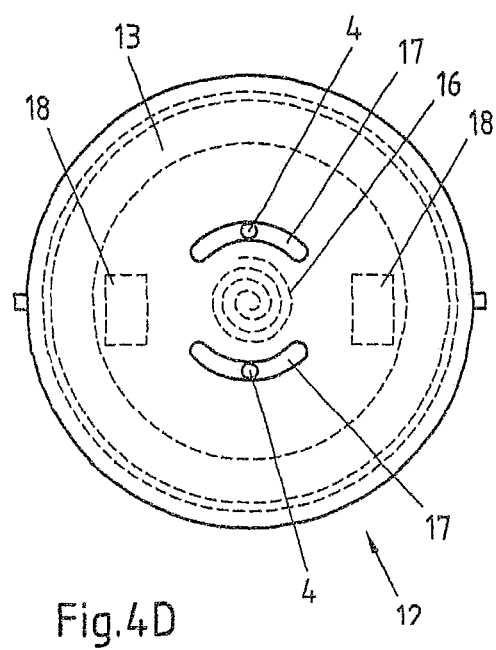
Fig.4C    Fig.4D

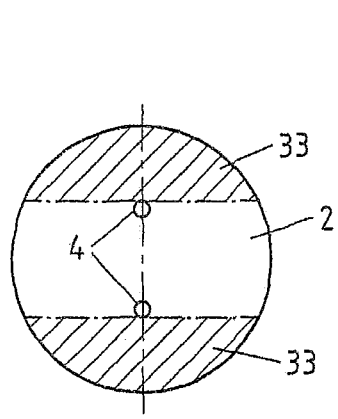
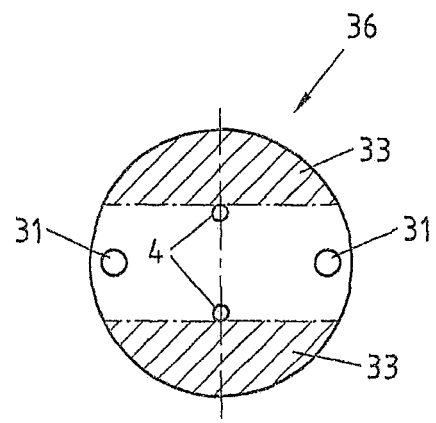
Fig.6C  Fig.6D
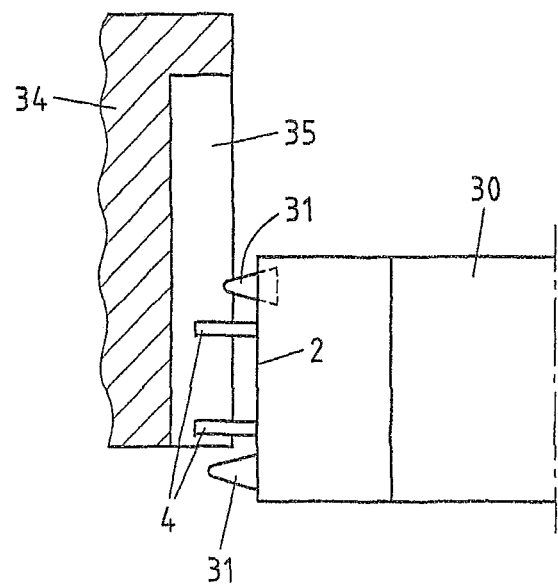
Fig.6E

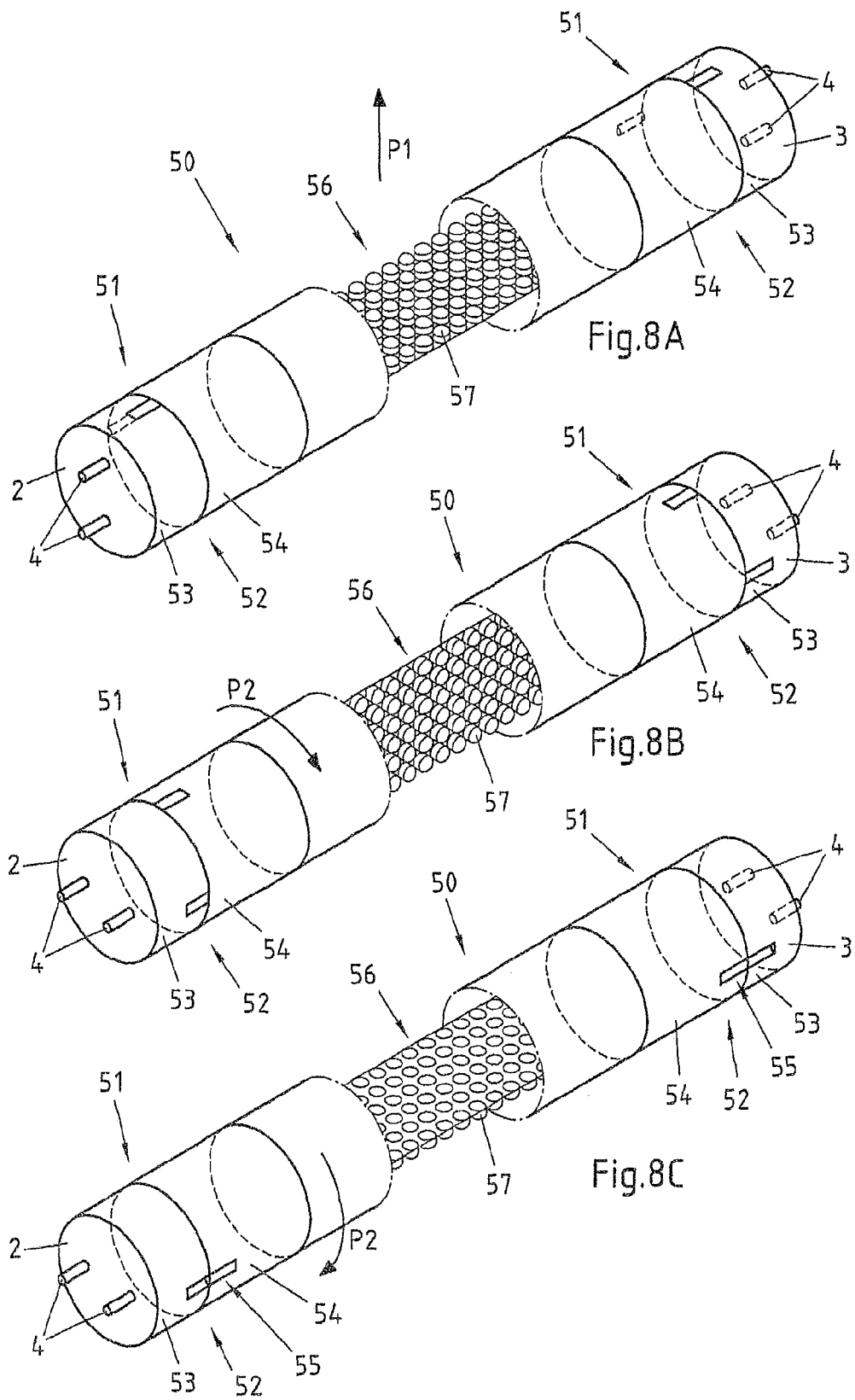

LAMP FOR REPLACING A FLUORESCENT TUBE

BACKGROUND OF THE INVENTION

1. Field of the Invention

The invention relates to a lamp, with a light-emitting unit, at least two separate contact modules and an electrical connection between the light-emitting unit and the contact modules, wherein each contact module has at least one electrical contact for connecting to a corresponding lampholder. The invention further relates to a system comprising a lamp and a lampholder, wherein for operation in the lampholder the lamp is designed corresponding to the lampholder.

2. Description of the Prior Art

Lamps with separate contact modules are used at present, especially as gas-discharge lamps, especially fluorescent lamps. Fluorescent lamps are mostly of tubular shape, so they are also called fluorescent tubes. These lamps differ from classical incandescent bulbs in that two separate contact modules are provided, with which electrical contact can be made between the lamp and the lampholder of a luminaire.

The contact module is understood as the part of a lamp that is provided directly for connection to the lampholder of a luminaire. In particular it is the part of a lamp that is designed corresponding to the lampholder, so that the lamp can be received in the lampholder. In the case of an incandescent bulb, for example the thread as a whole can be understood as the contact module, whereas in the case of conventional fluorescent tubes the end-face sections or end faces can be regarded as contact modules. Moreover, contact modules that are a certain distance apart, i.e. separate, are to be understood in particular as those between which a light-emitting unit of the lamp is provided, which applies in particular in the case of tubular lamps. Alternatively or additionally, two contact modules can be regarded as separate if light is emitted outwards between regions of the contact modules that are adjacent to one another.

"Lampholder" means, in the sense of the invention, a component of the luminaire that serves for receiving and interchangeably fastening the lamp to be operated with the luminaire.

In the case of fluorescent tubes, the two contact modules are often provided on opposite ends of the lamp. As a rule two contacts for electrical connection of the lamp to the lampholder are provided on each contact module. The actual light-emitting unit, which emits light under voltage, is connected via an electrical connection to the two contact modules.

If lamps with two contact modules that are a certain distance apart are inserted in a lampholder of a luminaire, the lamp can already be connected electrically conducting with the lampholder via one of the contact modules, while another contact module is not yet inserted in the lampholder. In this partially assembled state the user may unintentionally come in contact with the contact module that is not yet inserted in the lampholder. This is not a problem with gas-discharge lamps, because owing to their design, the user cannot receive an electric shock by touching the still accessible contact module.

The situation is different with lamps with which there is already increased conductivity between the electrical contacts of the two contact modules in the partially assembled state. This can be the case for example with light-emitting units comprising LEDs (light-emitting diodes). For such lamps it is therefore recommended for the contacts to be as close together as possible, to prevent a user receiving an electric shock if insufficient care is taken when inserting the lamp in a lampholder of a luminaire.

However, this is not possible when gas-discharge lamps, such as ordinary fluorescent tubes, are to be replaced with other lamps. In this case the lamps must be designed to be compatible with the existing lampholders provided for receiving fluorescent tubes.

The connections of conventional lampholders F for use with fluorescent tubes LS are, shown schematically in FIG. 1. As shown here, the fluorescent tubes LS are inserted upwards into the lampholder F. The lampholder F has a lampholder socket FS on both sides, on which two contacts K are provided, each connected to two contacts of the lamp. In FIG. 1A, the left lampholder socket FS has a lower contact L, on which the operating voltage is applied. The two upper contacts K of the two lampholder sockets FS are connected together via a so-called starter S. The lower contact represents the non-live neutral conductor N. However, there are also lampholders for operating fluorescent tubes as shown in FIG. 1B. In these, the lower contacts of the two lampholder sockets are connected together via a starter S, whereas the two upper contacts have the live contact L and the zero-voltage contact N. However, it can also be envisaged that the live and zero-voltage contacts L,N are provided sometimes below and sometimes above on the opposite lampholder sockets FS. Corresponding lampholders are shown in FIGS. 1C and 1D.

In order to avoid problems that arise when the lampholders for the use of fluorescent tubes are for example operated with LED-based lamps, until now a rewiring of existing lampholders, or luminaires has been proposed. This rewiring can take the form of supplying current to the lamp via two contacts of one and the same contact module. Corresponding lamps are also known as "conversion LED units". Another contact module is then provided just for inserting and holding the lamp in the lampholder, without an electrical connection having to be made there between the lampholder and the lamp.

Drawbacks of such solutions are the high cost of rewiring the lampholders and the fact that correspondingly rewired lampholders can no longer be operated with conventional fluorescent tubes.

Therefore the technical problem to be solved by the present invention is to design and elaborate lamps and systems in each case of the kind stated above in such a way that these can be operated reliably without using conventional gas-discharge lamps.

SUMMARY OF THE INVENTION

Accordingly, the invention has recognized that it is more desirable for the protection for the user against electric shock during fitting or removing of a lamp to be integrated in the lamp, instead of the corresponding lampholder, or for the luminaire that is to be used with the lamp to be equipped or rewired with a protective device. Not least, in this way high flexibility will be achieved in the use of the luminaire, as the luminaire can be designed to be operated with different lamps. For example, the luminaire can optionally be operated with a fluorescent lamp or with some other lamp. In the latter case the lamp is provided with a protective device that precludes the user receiving an electric shock when fitting the lamp.

The risk of an electric shock can of course also be excluded by isolating the lampholder or the luminaire from the power supply. This can take place by operating a switch provided for this on the luminaire or by pulling out the mains plug. As this is sometimes forgotten before fitting or removing a lamp, this option is regarded as inadequate. Moreover, hereinafter it will be assumed for simplicity that a potential difference is applied on the lampholder and there is therefore a potential risk of electric shock. This also means that in the following, an assembled state of the lamp is preferably to be understood as one in which a potential difference is applied on the lampholder.

The protective device is arranged in such a way that it can assume a deactivated position and an activated position. The protective device assumes the deactivated position when the lamp is in the assembled state. In the dismantled state of the lamp or in the dismantled state of the corresponding contact module, in contrast the protective device assumes an activated position. An activated position means a position in which the protective device prevents an electric shock. With the protective device in the deactivated position, the lamp can in contrast be operated without restriction of function for emitting light.

Depending on the design of the protective device and depending on the design of the lamp, the protective device can be assigned to one or more contact modules. From the standpoint of construction, however, it is advantageous if a protective device is assigned to just one contact module. Moreover, the protective device can be assigned to only one electrical contact of a contact module. However, it is also possible for the protective device to be assigned to several electrical contacts, especially two electrical contacts, of a contact module. From the construction standpoint it is preferable if a protective device is assigned to all contacts of a contact module.

The lamp can be of tubular shape like conventional fluorescent tubes and can have in each case one contact module on the two opposite ends or end faces. The lamp can be rectilinear or curved between the contact modules. The lamp can thus be used as a replacement for fluorescent tubes. Basically, however, any other configuration of the lamp may also come into consideration, if the contact modules are a sufficient distance apart. This applies in particular when the connection dimensions of the lamp coincide with conventional lamps, such as fluorescent lamps.

When the lamp is designed to be connected with a particular contact module first to a lampholder of a luminaire, a protective device can be dispensed with for this contact module. Basically, however, it may be preferable if at least one protective device is assigned to each contact module. The possibility of a user receiving an electric shock can then be avoided regardless of the orientation or order in which the contact modules are inserted in a lampholder of a luminaire. In this way, finally the possibility of improper operation is also taken into account.

Protective devices in the sense of the invention mean quite generally those that tolerate a maximum level of improper operation by the user. For example, a simple covering of a contact module, which covers the electrical contacts of a contact module and must be removed before fitting the lamp in a lampholder, is not to be regarded as a protective device in the sense of the invention. Thus, the user will remove such caps before fitting the lamp in a lampholder, so that such a cap can no longer protect the user against an electric shock during fitting of the lamp, especially in the partially assembled state.

Protective devices in the sense of the invention are, in contrast, preferably arranged to be captive on or in the lamp and are, preferably forcibly, deactivated when a contact module of the lamp is inserted into a corresponding lampholder and/or, preferably forcibly, activated when a corresponding contact module is removed from a lampholder corresponding to the lamp. The activation of a protective device therefore preferably already takes place when the lamp has not yet been removed completely from the lampholder, i.e. the lamp is in the partially assembled state. The protective device is then assigned to a contact module already removed from the lampholder, while another contact module is still connected electrically conducting with the lampholder.

Preferably the lamp has a light-emitting unit that has at least one LED, but especially a large number of LEDs. The LEDs can among other things be of the conventional, dome-shaped design, as SMDs (surface-mounted devices), as high-performance LEDs (H-LEDs), as organic light-emitting diodes (OLEDs) or as organic light-emitting transistors (OLETs). Then existing gas-discharge lamps, such as fluorescent lamps, especially fluorescent tubes, can be replaced with energy-saving lamps of the kind described above. However, consideration may in particular also be given to light-emitting units with incandescent filaments, with electroluminescent light-emitting devices or halogen lamps.

In a first preferred configuration of the lamp, the protective device is designed so that it can be deactivated mechanically, electrically, magnetically and/or thermally. Alternatively or additionally, the protective device can be designed so that it can be activated mechanically, electrically, magnetically and/or thermally. Protective devices that can be deactivated and/or activated in this way have the advantage that they can be designed to be very robust against improper operation. In addition the protective devices can easily be adapted to the respective application, i.e. in particular to the corresponding lampholder in each case.

In an especially preferred configuration of the lamp it is envisaged that the protective device comprises at least one electrically operable switch and a sensor element for controlling the switch. The combination of an electrically operable switch and a sensor element is to be understood for example as relays, especially semiconductor relays and/or low-voltage relays. As a rule this offers cost advantages. The relay can for example be constructed as a 230V relay. The relay can thus in certain cases be regarded at least as a part of the protective device.

Owing to the small space requirement it may be desirable if a so-called low-voltage relay known from the prior art is used, and indeed necessarily with at least one ballast system for producing the low voltage for the low-voltage relay. The ballast system is preferably provided as a component or within the lamp. The use of a ballast system is basically possible, even if for simplicity it is not always mentioned separately hereunder. For reducing an increased power loss, the ballast system can have a power-reducing element, such as at least one capacitor, which is switched on by a switch via the low-voltage relay when the protective device goes from the activated position to the deactivated position. In normal operation of the lamp, the current or the voltage is in this way lowered to a value that is sufficient for maintaining or locking the low-voltage relay. Initially, however, this current would not be sufficient to switch the protective device from the activated position to the deactivated position. Sufficient voltage or current is, however, available for switching the protective device from the activated position to the deactivated position, as the power-reducing element is not then active yet. As an alternative to using a ballast system, the low-voltage relay can also be provided with a necessarily envisaged driver system downstream. The low-voltage relay is thus controlled by the driver system. The driver system may in particular be necessary or at any rate desirable when using at least one light-emitting unit having LEDs. The driver system then takes over the voltage and/or current supply of the light-emitting unit. This is particularly important in the case of LEDs, as LEDs are operated with direct current. If the driver system is necessary anyway, with corresponding interconnection of the low-voltage relay at least one ballast system can be dispensed with.

In a preferred embodiment, the sensor element controlling the electrically operable switch is provided in a primary circuit, which is only closed by inserting the lamp on both contact modules into the lampholder. The switch controlled by the sensor element then preferably is located in a secondary circuit, in such a way that it closes the secondary circuit on insertion of the lamp into the lampholder.

The switch and necessarily also the secondary circuit in which the actual light-emitting unit of the lamp is located do not close until the switch is activated by the assigned sensor element following insertion of the lamp in the lampholder.

It can be envisaged that the primary circuit is only formed partially by the lamp and necessarily also comprises the lampholder, especially the starter that is provided there. In other words the current is conducted via the lampholder from one to the opposite contact module. If a starter is provided in this electrical connection of the lampholder, the electric current is only conducted with the starter closed. The starter is preferably arranged so that it is only electrically conducting when a voltage is applied to it. Instead of a conventional bimetallic starter, if necessary it is also possible to use an electronic starter, a jumper or a jumper with additional protection. For simplicity, however, only the term starter is used hereinafter.

The secondary circuit is preferably provided within the lamp between the two contact modules thereof. The secondary circuit can comprise other circuits, through which current flows in parallel and/or alternately, for instance depending on the position of corresponding switches. As a rule, however, a linguistic subdivision of the secondary circuit into further circuits or partial circuits is not necessary. It is only important that current only flows through the primary circuit after insertion and owing to the suitable interconnection downstream, makes the flow of current in the secondary circuit possible. The primary circuit is designed so that it is not closed until the lamp is completely inserted with all contacts in the lampholder of the luminaire. For the person installing the lamp, there is then no longer any risk of an electric shock. The primary circuit can be designed similarly to conventional fluorescent tubes, in which current first flows via the starter from one to the other contact module, until the gas within the fluorescent tube ignites, whereupon the current flows, by-passing via the gas, from one contact module to the other contact module.

A sufficiently high electrical resistance is provided in the primary circuit, for the case when this connects the two contact modules of the lamp electrically by an electrical connection within the lamp. In this way the contact voltage in the activated position of the protective device is sufficiently limited to preclude endangering the user when fitting the lamp. The sufficient resistance can only be provided by a sensor element provided in the primary circuit. However, an additional, preferably ohmic, resistance of a suitable magnitude can also be provided. For reliable prevention of the risk of an electric shock, a resistance of at least two megohm (MΩ) can be provided between the contact modules in a state envisaged during insertion of the lamp. This applies in particular to the mains voltage and the mains frequency with which the lamp is to be operated.

When a switch is provided in the connection between the contact modules, to separate the two contact modules electrically from one another in the activated position of the protective device, the switch must be opened wide enough so that a voltage flashover is reliably prevented. Alternatively, instead of the one switch, a plurality of switches can be connected in series, in order to prevent a voltage flashover. It is especially preferable in this connection to provide a dielectric strength of 3 kV, for reliably precluding endangering of the user. The plurality of switches can be switched by one or by a plurality of sensor elements. Owing to the minimum necessary current for switching by means of sensor elements, series arrangement of the plurality of sensor elements is suitable. If the current or the power loss is not a limiting factor, however, the plurality of sensor elements can also be connected in parallel. Through the plurality of switches arranged in series, which are actuated on switching from the activated position to the deactivated position of the protective device, alternatively or additionally a higher tolerance against failure of such a switch is achieved. One of the switches can for example fail because its contacts remain "stuck" (contact sticking). This may occur for instance with frequent switching of the switch. The contacts of the switch can then weld together, so that the switch no longer switches, but remains permanently in the corresponding position.

In an alternative configuration of the lamp, at least one measuring device is provided, which detects the voltage drop between at least two contacts of the lamp. Furthermore, at least one switch is provided for suitable interconnection of the lamp with the lampholder of the luminaire. By detecting the voltage between the contacts, it is established that the lamp is fully inserted in the lampholder. The circuit for operating the lamp is then switched to conduct by the switch. The secondary circuit can if necessary be interrupted completely beforehand between the two contact modules.

If necessary, at least one logic circuit connected to the measuring device is provided, which establishes the installation position of the lamp relative to the lampholder of the luminaire, i.e. how the interconnection of the lamp with the lampholder of the luminaire is arranged. This can vary with various lampholders or depending on the orientation with which the lamp is inserted in the lampholder. The logic circuit can, based on the installation position of the lamp relative to the lampholder determined from the at least one voltage drop that is established, switch the at least one switch in such a way as is sensible for the corresponding installation position for operating the light-emitting unit. Thus, not inadvertently critical operating states may arise.

By detecting the magnitude of the voltage drop, if necessary it is possible for the lamp to distinguish cases in which the lamp is fitted in a duo circuit or tandem circuit in lampholders connected in parallel or series, from the cases in which the corresponding lampholder is connected neither in series nor in parallel with other lampholders. Then too, a suitable position of the at least one switch can be brought about.

Especially for detecting the installation position and for corresponding adaptation of the interconnection of the light-emitting unit with the contacts of the lamp, it can be envisaged that the at least one measuring device determines voltage drops between different contacts of the lamp and, based on the voltage drops, a logic circuit controls a plurality of switches in a manner that is predetermined for the installation position that is found. In particular the measuring device is arranged so that it determines the voltage drops on four different pairs of contacts of the lamp.

The contacts of each pair of contacts can be distributed on both contact modules of the lamp. Alternatively or additionally, preferably four switches can be provided, so that in each installation position the light-emitting unit can be interconnected optimally with the contacts of the lamp. For simplicity, the switches are also assigned four different pairs of contacts of the lamp.

So that further intervention on the part of the installer is unnecessary after insertion of the lamp in a lampholder, the at least one switch is preferably an electrically operable switch. The measuring device can then be coupled to the switch in such a way that it is switched automatically in a predetermined way depending on the at least one voltage drop found.

To avoid unintentional disturbance in the operation of the lamp, the at least one protective device is preferably designed in such a way that the protective device is deactivated automatically and/or forcibly on insertion of the lamp into the lampholder. So that a high level of safety against electric shock can also be provided during dismantling of the lamp, in another configuration of the lamp a protective device is provided with a reset mechanism. This reset mechanism is actuated automatically during dismantling of the lamp, i.e. especially during dismantling of the corresponding contact module.

This automatic actuation of the reset mechanism transfers the protective device into an activated position. The risk of an electric shock during dismantling of the lamp from the lampholder can thus be reliably prevented. For simplification of the protective device and for ensuring high operational safety, the reset mechanism can be spring-loaded. During resetting of the protective device to an activated position, the protective device or at any rate parts thereof can be displaced, rotated and/or swivelled. Corresponding reset mechanisms can be of simple construction and they rarely malfunction.

In a preferred configuration of the lamp, the at least one protective device is designed as at least one contact protection that is actuated mechanically. In the activated position of the contact protection, this prevents contact of at least one electrical contact by the user during fitting or dismantling of the lamp. Conversely, in the deactivated position the contact protection releases the at least one electrical contact of the corresponding contact module assigned to the contact protection for connection to the lampholder. The configuration of the protective device as a mechanical contact protection represents a constructionally simple and economical solution. The electrical contact assigned to the mechanical contact protection can be energized in the partially assembled state of the lamp. Inadvertent contact of this electrical contact by the user is prevented by the contact protection, if the corresponding contact module of the respective electrical contact is not yet inserted in the lampholder and/or the mechanical contact protection has not yet been moved by the user into the deactivated position.

It is especially simple and effective if, in the deactivated position, the mechanical contact protection is pressed together, rotated, displaced and/or swivelled. A movement directed against the corresponding movement preferably changes the mechanical contact protection from the deactivated position to the activated position. The mechanical contact protection therefore only needs to allow forwards and backwards movement and can therefore be of constructionally simple design.

Alternatively or additionally, the mechanical contact protection can be designed so that, during fitting of the lamp, it is transferred automatically from the activated position to the deactivated position. Then no separate operation of the mechanical contact protection by the user is required. Rather, the mechanical contact protection is deactivated immediately by the assembly steps necessary for fitting the lamp. To provide this functionality in a simple manner, it can be envisaged that the mechanical contact protection is brought into the deactivated position by pressing together, rotating and/or swivelling.

The mechanical contact protection can have at least one opening, which is made to coincide with at least one electrical contact by a rotating movement of the contact protection. In this way the corresponding electrical contact is easily accessible externally through the opening or can pass through the opening to the exterior, when the mechanical contact protection is in the deactivated position. On the other hand, accidental touching of the electrical contact is precluded when the mechanical contact protection is in the activated position.

In this connection, it is moreover suitable if the mechanical contact protection can be pressed together when the at least one opening coincides with the at least one electrical contact. Thus, the electrical contact can pass through the at least one opening to the exterior, without this requiring complicated operations. If the mechanical contact protection is assigned to a contact module that has several electrical contacts, a separate opening can be provided for each electrical contact.

Alternatively, the mechanical contact protection can, however, also be designed so that several electrical contacts of a contact module pass through one opening, when the mechanical contact protection is transferred to the activated position.

Alternatively or additionally, it is desirable from the standpoint of design if an elastic means is provided, which moves the mechanical contact protection back to the activated position during dismantling of the lamp. In particular, the elastic means can, as a result of the spring force, reverse a rotating movement, a swivelling movement and/or a pressing together of the mechanical contact protection for its activation. In this way deactivation of the mechanical contact protection can be initiated automatically, as soon as the mechanical contact protection obtains the necessary freedom of movement during dismantling of the lamp. For this, it is especially desirable, because it is constructionally simple, if the elastic means is deflected in the deactivated position of the mechanical contact protection. The spring force of the elastic means then acts backwards in the direction of the activated position of the mechanical contact protection.

Alternatively or additionally to the configuration of the protective device described above, it can be envisaged that the protective device comprises at least one mechanically operable switch and that the mechanically operable switch is closed in the assembled state of the lamp and/or is open in the dismantled state of the corresponding contact module. A mechanically operable switch is to be understood as a component that is to be actuated mechanically, which does not oppose touching an electrical contact, but limits the contact voltage to a non-critical value on said touching. With respect to increased user friendliness, it is suitable if the mechanically operable switch is closed automatically on insertion of the corresponding contact module in a corresponding lampholder and opens automatically again on removal of the corresponding contact module from the corresponding lampholder. This can for example be achieved by constructing the mechanically operable switch as a button, which returns to the starting position on completion of actuation. Then no separate operations are required for deactivation and/or for activation of the corresponding protective device.

In a preferred embodiment, the mechanically operable switch is designed to be closed and/or opened immediately through interaction with the corresponding lampholder. A corresponding lampholder is to be understood, in the sense of the invention, as a conventional lampholder, which is suitable for receiving the lamp. The lampholder does not need to have any special means for actuating the mechanically operable switch when fitting the lamp in the corresponding lampholder. Otherwise a considerable expenditure would be required for suitably adapting the lampholders of the luminaires that are to be operated with the corresponding lamp, to the actuation of the mechanically operable switch.

Basically the mechanically operable switch can be designed as a rotary switch and/or as a pressure switch. Pressure switches are as a rule constructionally simpler, whereas rotary switches guarantee higher operational reliability.

To ensure that the mechanically operable pressure switch is not closed until the at least one contact of the assigned contact module can no longer be touched unintentionally by the user, it is suitable if the at least one mechanically operable pressure switch is provided between two electrical contacts of the corresponding contact module and/or if two electrical contacts are provided between at least two switches that are to be actuated mechanically. When several pressure switches and/or several electrical contacts are assigned to one contact module, these can be arranged one after another in a line.

To ensure a maximum level of safety during fitting and dismantling of the lamp, the at least one mechanically operable pressure switch can have at least two switching elements. In this way the number of pressure switches required can be reduced. In an especially preferred configuration the at least two switching elements are to be actuated from different spatial directions. Actuation in this sense can preferably be understood as pressing of the switching element into the lamp. In this way the at least two switching elements can be actuated when the lamp assumes a predetermined distance in the corresponding spatial directions to the corresponding lampholder. This is preferably the case in the assembled state of the lamp. In an extremely functional and at the same time simple configuration of the mechanically operable pressure switch, this is arranged so that it is closed by the actuation, especially the pressing, of the at least two switching elements.

The protective device can, alternatively or additionally, also be designed as a switch to be actuated magnetically. It is in particular envisaged that the magnetically operable switch is designed so that it is opened when the lamp is inserted into the lampholder. This can be achieved in a simple way, for example by providing, on or in the lampholder of the luminaire, at least one magnet for actuating the at least one switch to be actuated magnetically. Alternatively it can be envisaged that for installation of the lamp in the luminaire, a magnet must be fitted, which actuates the magnetically operable switch and cannot be fitted in the lampholder or on the lamp until after completed installation of the lamp. For this, the magnet can for example be provided on a clip that grips around the lamp, the lampholder and/or the luminaire in sections. The clip can in addition be designed and/or arranged so that during dismantling of the lamp it is forcibly dismantled from the lamp, the lampholder and/or the luminaire.

In order for the device for actuating the magnetically operable switch to be incorporated in the lamp, a primary circuit can be provided for producing a magnetic field in the assembled state of the lamp. The magnetically operable switch can then preferably be arranged so that it is closed as a result of the magnetic field of the primary circuit. It is not until the at least one magnetically operable switch is closed that current flows through the secondary circuit, in which the actual light-emitting unit is provided. In this way high operational safety can be achieved by very economical and space-saving measures.

The protective device can alternatively or additionally also be designed as a switch that is to be actuated thermally. The thermally operable switch is first opened when fitting the lamp in the corresponding lampholder and can then be closed in the case of heating of the switch. This configuration of the protective device also represents a simple and economical solution.

In another preferred configuration of the protective device, a primary circuit is provided for generating heat in the assembled state of the lamp. For this, the primary circuit can have a heating resistor, which is arranged in the vicinity of the switch that is to be actuated thermally. As a result, the thermally operable switch is closed on account of the heat generated by the primary circuit. It is only when the at least one thermally operable switch is closed that current flows through a secondary circuit that has the light-emitting unit of the lamp. Since individual, preferably all, electrical contacts of the lamp first have (low-ohmic) current flowing through them when touching of the contacts can lead to endangering of the user, when they are finally connected to the corresponding lampholder, these electrical contacts are reliably protected against touching by the installer even with the lamp partially installed.

Regardless of whether the switch of the protective device is to be actuated mechanically, thermally, magnetically or electrically, the lamp can have a relay, for example a semiconductor relay and/or a low-voltage relay for locking a secondary circuit, provided voltage is applied on the primary and/or secondary circuit, wherein the secondary circuit has the actual light-emitting unit of the lamp. The at least one relay can then have the switch of the protective device, so that it is not absolutely necessary to have another relay for locking.

Thus, the primary circuit must only come into action initially during switching-on of the lamp. Continuous operation is then provided readily by the locking of the secondary circuit. The secondary circuit can comprise circuits that are operated alternatively or simultaneously, for instance depending on the position of optionally provided switching elements. Regardless of the complexity of these circuits, they are downstream of the primary circuit and can therefore be designated together as a secondary circuit. The same also applies analogously to the primary circuit, although from the constructional standpoint this is preferably designed to be as simple as possible. In a preferred configuration of the lamp, a switch is provided between two contacts of a contact module and the light-emitting unit. This makes it possible for either the one contact or the other contact of a contact module to be connected conducting with the light-emitting unit and this increases the flexibility when using the lamp.

The lamp is preferably arranged so that, when in the intended orientation to the lampholder it is inserted in the latter, it can be operated directly and safely. If, however, the lamp is not in the intended orientation to the lampholder when inserted into it, perhaps because the wiring of the lampholder is other than expected (cf. FIG. 1A to 1D) and/or the lamp is inadvertently held incorrectly during insertion in the lampholder, this can be corrected following insertion of the lamp in the lampholder by operating the switch, without having to remove the lamp from the lampholder and reinsert it in the lampholder in the other orientation to the latter.

Alternatively or additionally, this can prevent short-circuiting with an undesirable installation position of the lamp relative to the lampholder. It can be envisaged that the lamp functions in both switch positions, although one switch position leads to a preferred operation of the lamp. However, it can also be envisaged that the lamp does not emit light, depending on the installation position thereof in the lampholder. This is then a signal to the installer to actuate the switch, which leads to operational switching and emission of light by the light-emitting unit. The switch can preferably be actuated manually, electrically, magnetically or thermally.

Alternatively or additionally, a polarity-reversing device can be provided between two contacts of a contact module and the light-emitting unit for reversing the polarity of the contacts of the one contact module relative to the light-emitting unit. The polarity-reversing device allows the two contacts of the one contact module in the lamp circuit to exchange their places. Corresponding devices are known per se from the prior art and can for example be designed as so-called cross connections, which can be actuated manually or automatically. For example the polarity-reversing devices can have two switches or one bipolar-switching switch. The switches can preferably be controlled mechanically or electrically, for instance by a switch or a relay, especially a semiconductor relay and/or a low-voltage relay. In this way an undesirable installation position of the lamp relative to the lampholder through fitting of the lamp in a non-preferred orientation relative to the respective lampholder can be corrected. An undesirable installation position can be characterized in that the light-emitting unit does not emit light despite applying the mains voltage.

In this connection it may be preferable if a sensor element is provided, which automatically controls the polarity-reversing device in the case of a predetermined, non-preferred interconnection of the lamp with the lampholder, for reversing the polarity of the contacts of the one contact module relative to the light-emitting unit. The contacts are thus interchanged automatically relative to the lamp circuit, when a predetermined operating case, i.e. especially a predetermined installation position of the lamp relative to the lampholder, is present. In this context, basically the installation position means not merely the orientation of the lamp, but rather the relationship of the contacts of the lamp and the lampholder. Thus, even with identical orientation of the lamp, but different wiring of the lampholder, there may be different installation positions (cf. FIG. 1A to 1D).

However, optionally it is simpler and sufficient when an externally accessible mechanically operable switch is provided for actuating the polarity-reversing device. The installer preferably receives information about the actual installation position or generally about whether actuation of the polarity-reversing device is indicated. In the simplest case this may occur because the lamp does not emit light after being installed in the lampholder. This can then be corrected for example by manual operation of the switch. For manual operation of the switch, preferably a switch or the like is provided that can be actuated externally, without having to dismantle the lamp again.

However, for greater convenience and to prevent uncertainty on the part of untrained installers, it can also be envisaged that an optical and/or acoustic signal generator indicates whether with the corresponding installation position of the lamp relative to the lampholder, the polarity-reversing device should be activated. This can be achieved by providing the signal generator in the lamp circuit in such a way that the signal generator is active when the lamp is in a predetermined installation position.

If the lamp is in some other installation position, which preferably differs from the installation position described above in that the contacts of the one contact module are interchanged by means of a polarity-reversing device, the signal generator is inactive. Here, inactive can be de-energized and active can be energized.

The signal generator can also be coupled to a sensor element and a switching unit. The coupling is such that in a predetermined operating state and/or a predetermined installation position, the sensor element controls the switching unit for activation of the signal generator. The signal generator is then active and preferably indicates that the polarity-reversing device should be activated for reversing the polarity of the corresponding contacts. Through activation of the switching unit, not only the signal generator can then be activated, but also an unfavourable operating state can be avoided. This is for example advantageous when, in the unfavourable operating state, too large a proportion of the current flows past the light-emitting unit, especially from contact module to contact module. Without the switching unit, this would for example lead to increased power loss, an excessive total power consumption and/or the risk of a short circuit.

If a switching unit coupled to the signal generator is provided, this is preferably of resettable design and/or coupled to a resetter. This makes it possible to reset the switching unit to the initial state. If after activation of the signal generator the polarity-reversing unit has been actuated, the lamp has been turned relative to the lampholder or there has been some other suitable reaction to the signal of the signal generator, the lamp or its circuit can be reset to the initial state, so that the signal generator is deactivated if the lamp is no longer in the predetermined, non-preferred installation position or no longer in the predetermined, non-preferred operating state.

If necessary, alternatively or additionally a signal generator can be provided, which in the activated case indicates that the lamp is in a preferred operating state and the polarity-reversing unit should not be actuated, the lamp should not be turned relative to the lampholder or there should not be some other kind of intervention in the operating state of the lamp.

When for functional reasons at least one sensor element is provided, which in a first predetermined installation position or a first predetermined operating state leads to a power loss, but in a second predetermined installation position or in a second predetermined operating state causes a smaller or no power loss, the lamp circuit can additionally have a signal generator, for indicating that the lamp is in an installation position associated with a higher power loss or in an operating state associated with a higher power loss. The signal generator is provided in such a way that it is activated in the first predetermined installation position or in the first predetermined operating state. The sensor element can preferably be formed by a relay, especially semiconductor relay and/or low-voltage relay. As a result, the installer is caused to rotate the lamp relative to the lampholder, if necessary reverse the polarity of the contacts of a contact module, to incorporate a contact into the electrical interconnection of the light-emitting unit via a corresponding switch by exchange with another contact of the same contact module. As a result, the sensor element does not lower the electrical power or lowers it less markedly.

If necessary, alternatively or additionally, a signal generator, if necessary a further signal generator, can be provided, which in the activated case indicates that in a preferred installation position the lamp for instance has low loss or low power consumption and operation of the lamp without further intervention is proposed or recommended.

Preferably, the protective device is designed so that in the partially assembled state of the lamp the contact voltage on an electrical contact assigned to the protective device is below 50 V (AC) and/or 120 V (DC). In this case the risk of an electric shock can be ruled out. An electric shock in this sense therefore means an electric shock endangering the health of the user. If the contact voltage is low enough, endangering the health of a user can be ruled out. In order to protect not only humans, but also other creatures or particular electrical units against electric shock, the protective device can be designed to remain below a contact voltage of 25 V (AC) and/or 60 V (DC). In other words the contact voltage must not be lowered to 0 V (AC/DC), to remove the risk of the operator receiving an electric shock in the sense of the invention.

Alternatively or additionally, for avoidance of an electric shock for the installer, it can be envisaged that, with the protective device activated, a resistance of at least 2 MΩ is provided between the contact modules. This resistance arises in particular on applying the mains voltage to a contact module. The lamp is then envisaged in particular for operation with this mains voltage.

To increase the flexibility of use of the lamp, the lamp can be designed to be compatible with a fluorescent lamp or fluorescent tube. Thus, the lamp, which is not a fluorescent tube, can be operated without any problems in a lampholder that is intended for operation of a fluorescent tube. It is especially preferable if the lamp is designed to be compatible with fluorescent tubes of type T4, T5, T8, T10 and T12. Then the lamp can be inserted in a corresponding lampholder without problems as a replacement for a fluorescent tube of the aforementioned type and can be operated there. Additionally or alternatively, it can be envisaged that the lamp is designed to fit and to operate in a lampholder of type G5 or G13.

The problem stated at the beginning is also solved in a system with the features of the characterizing clause of Claim 35, namely in that the lamp is constructed according to one of Claims 1 to 34 and in that, in the installed state of the lamp in the lampholder, the protective device is forcibly deactivated and in the dismantled state is activated.

The advantages achieved by the system are also based on the fact that the protective device, which prevents the user of the lamp receiving an electric shock during assembly or dismantling of the lamp, is integrated in the actual lamp and not in the luminaire.

In this connection it is especially preferable if the lampholder of the luminaire is suitable for operation with fluorescent tubes. It is then possible to operate the luminaire, or the corresponding lampholder, both with fluorescent tubes and with other lamps. When changing from the use of fluorescent tubes to other lamps, no adaptation or only a slight adaptation of the lampholder or luminaire is required. Integration of a protective device in a lamp that is not a fluorescent tube ensures that the user cannot receive an electric shock. Moreover, with this system a fluorescent tube can also be operated without any problem, without the lampholder and/or the luminaire having to be altered at all, or at any rate expensively.

When the lamp of the system has at least one switch that is to be actuated magnetically, it can be envisaged that the lampholder and/or the luminaire has at least one magnet for actuating the switch that is to be actuated magnetically. Corresponding magnets can also be provided later without any problem on existing, conventional lampholders, for example by gluing. In addition, the at least one magnet can be provided on or in the lampholder taking up so little space that despite the magnet, the lampholder can also be operated with a conventional fluorescent tube.

When the protective device of the lamp has at least one switch that is to be actuated magnetically, it can also be envisaged that at least one clip is provided. This clip can then have at least one magnet and can be fastened on the lamp, on the lampholder and/or the luminaire. If the clip is preferably fitted subsequently, i.e. after installing the lamp, the at least one magnet comes close to the at least one magnetically operable switch, so that the latter is closed. Therefore the corresponding protective device is in the deactivated position and the lamp can be operated.

BRIEF DESCRIPTION OF THE DRAWINGS

The invention is explained in more detail hereunder on the basis of drawings, which only show exemplary embodiments. The drawings show.

DETAILED DESCRIPTION OF THE INVENTION

In FIG. 1A to 1D, lampholders F are shown with fluorescent tubes LS inserted therein, wherein the lampholders F are wired in various ways. The live contact L is arranged either below or above in the lampholder F. The neutral conductor N is also provided either below or above relative to the lampholder F. The two remaining contacts of the lampholder F are then connected together via a starter S.

Figure 1A:
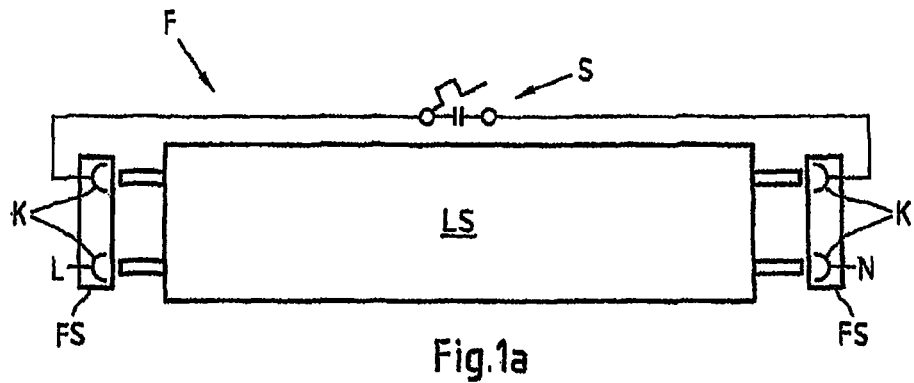
FIG. 1A-1D systems of the prior art of a fluorescent tube and a lampholder of a luminaire with various wiring, FIG. 2 a first exemplary embodiment of the lamp according to the invention with mechanical contact protection in longitudinal section, FIG. 3 a second exemplary embodiment of the lamp according to the invention with mechanical contact protection in longitudinal section, FIG. 4A-4D a third exemplary embodiment of the lamp according to the invention with mechanical contact protection in various sectional views, FIG. 5A, 5B a fourth exemplary embodiment of the lamp according to the invention with a mechanically operable pressure switch, shown schematically, FIG. 6A-6E a fifth exemplary embodiment of a lamp according to the invention with a mechanically operable pressure switch in various views, FIG. 7A, 7B a sixth exemplary embodiment of a lamp according to the invention with a mechanically operable pressure switch, shown schematically in various positions, FIG. 8A-8C a seventh exemplary embodiment of a lamp according to the invention with a mechanically operable rotary switch, in various positions, FIG. 9A-9C an eighth exemplary embodiment of a lamp according to the invention with a mechanically operable rotary switch, in various views and different positions, FIG. 10 a ninth exemplary embodiment of a lamp according to the invention with an electrically operable switch, shown schematically, FIG. 11 a tenth exemplary embodiment of a lamp according to the invention with an electrically operable switch, shown schematically, FIG. 12 an eleventh exemplary embodiment of a lamp according to the invention with a magnetically operable switch, shown schematically, FIG. 13 a twelfth exemplary embodiment of a lamp according to the invention with a thermally operable switch in a schematic representation, FIG. 14 a thirteenth exemplary embodiment of a lamp according to the invention with a thermally operable switch in a schematic representation, FIG. 15 a system according to the invention comprising a fourteenth exemplary embodiment of a lamp according to the invention with a magnetically operable switch, shown schematically, FIG. 16 a fourteenth exemplary embodiment of a lamp according to the invention with an interconnection of the light-emitting unit that is to be adapted to the installation position, FIG. 17 a fifteenth exemplary embodiment of a lamp according to the invention with an interconnection of the light-emitting unit that is to be adapted to the installation position, FIG. 18 a sixteenth exemplary embodiment of a lamp according to the invention with an interconnection of the light-emitting unit that is to be adapted to the installation position, FIG. 19 a seventeenth exemplary embodiment of a lamp according to the invention with an interconnection of the light-emitting unit that is to be adapted to the installation position, FIG. 20 an eighteenth exemplary embodiment of a lamp according to the invention with an interconnection of the light-emitting unit that is to be adapted to the installation position, FIG. 21 a nineteenth exemplary embodiment of a lamp according to the invention with an interconnection of the light-emitting unit that is to be adapted to the installation position, FIG. 22 a twentieth exemplary embodiment of a lamp according to the invention with an interconnection of the light-emitting unit that is to be adapted to the installation position, FIG. 23 a twenty-first exemplary embodiment of a lamp according to the invention with an interconnection of the light-emitting unit that is to be adapted to the installation position, FIG. 24 a twenty-second exemplary embodiment of a lamp according to the invention with an interconnection of the light-emitting unit that is to be adapted to the installation position, FIG. 25 a twenty-third exemplary embodiment of a lamp according to the invention with an interconnection of the light-emitting unit that is to be adapted to the installation position, FIG. 26 a twenty-fourth exemplary embodiment of a lamp according to the invention with an interconnection of the light-emitting unit that is to be adapted to the installation position and FIG. 27 a twenty-fifth exemplary embodiment of a lamp according to the invention with an interconnection of the light-emitting unit that is to be adapted to the installation position.
Figure 1B:
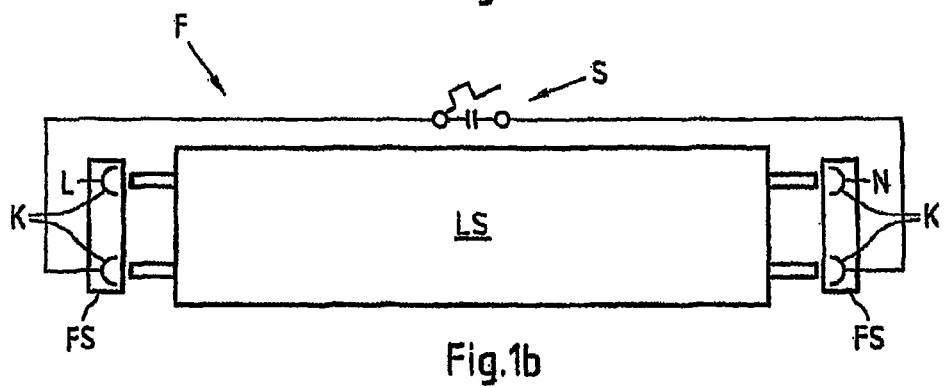
Figure 1C:
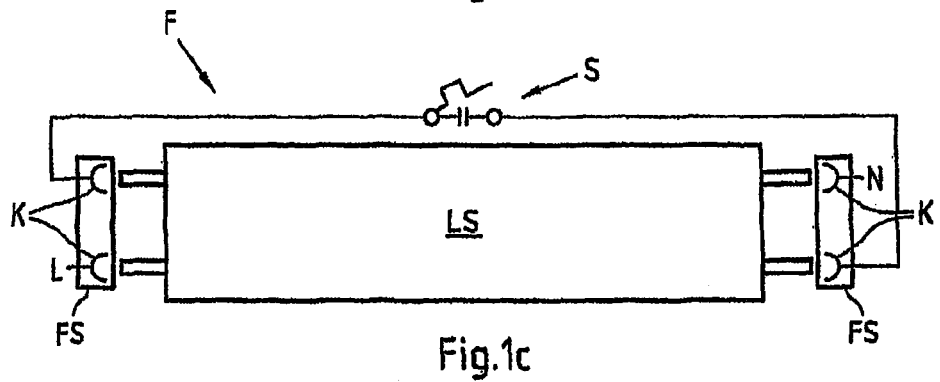
Figure 1D:
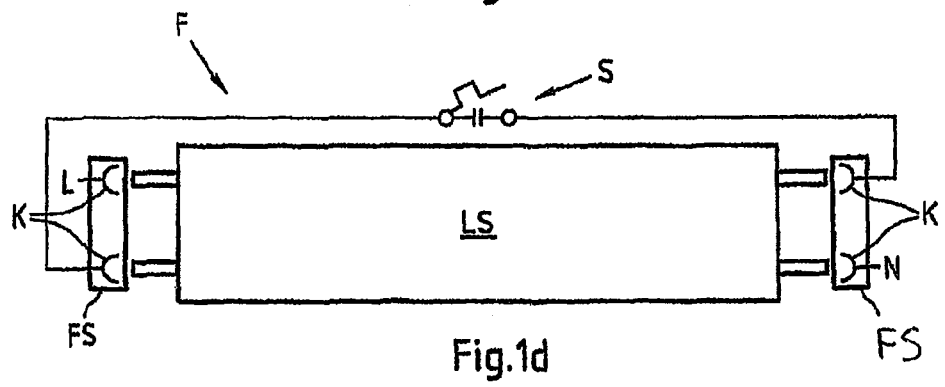
Figure 2:
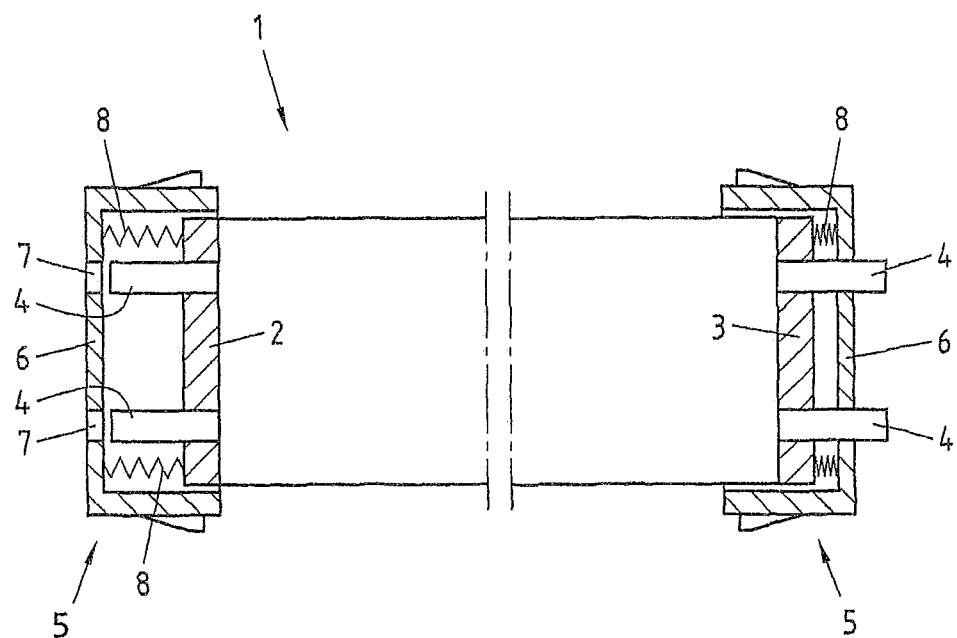

FIG. 2 shows a tubular lamp 1, which is designed for replacing fluorescent tubes. For this, the lamp 1 has, at the two opposite ends, in each case a contact module 2, 3 with in each case two electrical contacts 4 for electrical connection of the lamp 1 to a lampholder for receiving fluorescent tubes. The connection dimensions of the lamp 1 shown correspond to the connection dimensions of a conventional fluorescent tube. Each of the two contact modules 2, 3 is assigned a protective device 5 in the form of a mechanical contact protection. In the activated position of the protective device 5 shown on the left, each mechanical contact protection covers the two electrical contacts 4 of the assigned contact module 2, 3. In this way, inadvertent touching of the contacts 4 when inserting the lamp 1 in a lampholder is prevented.

The protective device 5 comprises a cap 6, in which an opening 7 is provided for each electrical contact 4. The corresponding openings 7 and electrical contacts 4 are mutually oriented so that the electrical contacts 4 of a contact module 2, 3 project through the openings 7 of the protective cap 6, when the protective cap 6 is pressed inwards, i.e. is pressed in. In this movement, the spring forces of elastic means 8 that are provided between the protective cap 6 and the contact module 2, 3 must be overcome. By pressing-in the protective cap 6 against the spring forces of the elastic means 8, the protective device 5 assumes a deactivated position, which is shown on the right-hand side of FIG. 2. The electrical contacts 4 then project through the openings 7 of the protective cap 6 outwards and can thus be connected electrically to a lampholder.

Figure 3:
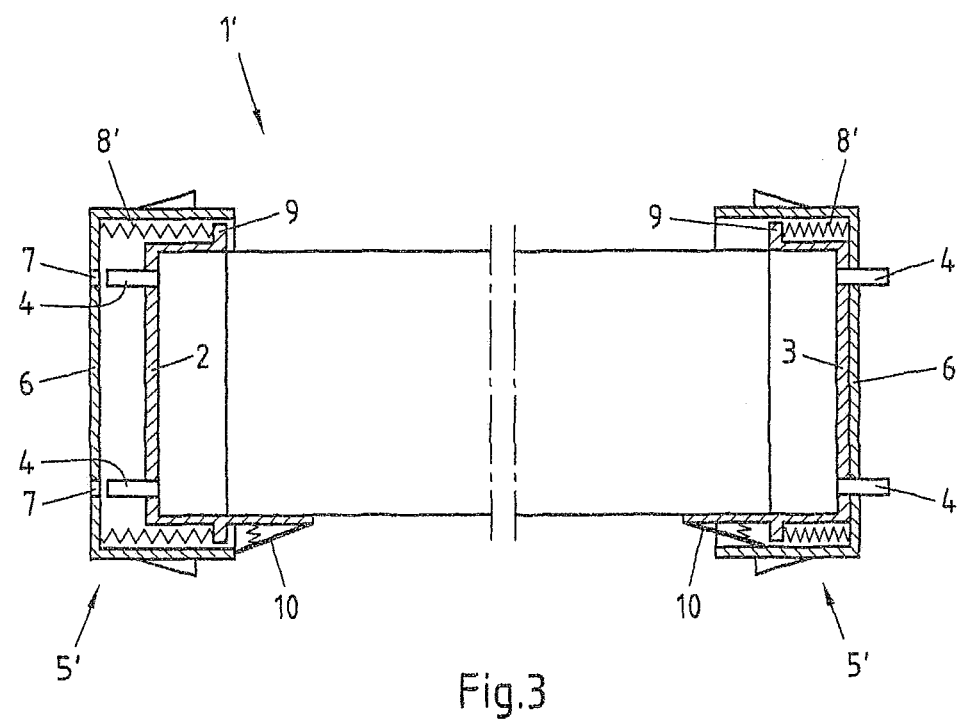

FIG. 3 shows a modified lamp 1', in which the two contact modules 2, 3 are also provided with a protective device 5' in the form of a mechanical contact protection. In contrast to lamp 1 shown in FIG. 2, lamp 1' according to FIG. 3 has, on each of the contact modules 2, 3, displaced inwards from the corresponding contact module 2, 3, at least one externally collared segment 9. Elastic means 8' bear against this at least one collared segment 9, and their opposite ends are connected to the protective cap 6 of the protective device 5'. The protective cap 6 can therefore be pressed in until the protective cap 6 bears against the corresponding contact module 2, 3 of the lamp 1'. In this deactivated position of the protective device 5', which is shown on the right-hand side of FIG. 3, the electrical contacts 4 pass through corresponding openings 7 in the protective cap 6 outwards and thus are available for electrical connection to a lampholder. Spring-loaded locking mechanisms 10 prevent the inadvertent pressing-in of the protective caps 6' in the activated position of the protective devices 5'. If the locking mechanism 10 is pressed together, the corresponding protective cap 5' can be pressed inwards over the locking mechanism 10, as shown on the right-hand side of FIG. 3.

FIG. 4 shows a lamp 11 with a protective device 12 in the form of a mechanical contact protection for at least one of the two contact modules 2. The mechanical contact protection comprises a protective cap 13, which is joined to a guide element 14. In the preferred lamp 11 that is shown, the guide element 14 is made disk-shaped and has two openings 15, in which in each case one electrical contact 4 of the contact module 2 is received. The protective cap 13 is connected via a spiral spring 16 to the guide element 14, so that the protective cap 13 can be rotated opposite the guide element 14 against the spring force of the spiral spring 16. Instead of a spiral spring, a torsion spring could also be provided.

The protective cap 13 has two openings 17, which in the lamp 11 shown and in this respect preferred, are slot-shaped. By turning the protective cap 13 against the guide element 14, the two openings 17 of the protective cap 13 come to coincide with the openings 15 of the guide element 14 and therefore the electrical contacts 4 of the contact module 2. In this position of the protective cap 13, the protective cap 13 together with the guide element 14 can be pressed inwards against the lamp 11. In the lamp 11 shown and in this respect preferred, at least one compression spring 18 is pressed together, which is arranged between the contact module 2 and the guide element 14. Through the rotating movement described and the pressing-in of the protective cap 13 of the mechanical contact protection, the protective device 12 goes from the activated position shown in FIGS. 4A and 4B to the deactivated position shown in FIGS. 4C and 4D, in which the electrical contact 4 projects outwards through the protective cap 13.

During dismantling of the lamp 11, the protective cap 13, which in the assembled state of the lamp 11 is held by a lampholder, is pressed outwards by the compression spring 18, until the protective cap 13 is freely rotatable and is no longer blocked by the electrical contacts 4 projecting through the openings 17. In this state, as a result of the spring force of the preloaded spiral spring 16, the protective cap 13 is turned back to the starting position, in which the openings 17 of the protective cap 13 do not coincide with the electrical contacts 4 of the associated contact module 2.

Figure 5A:
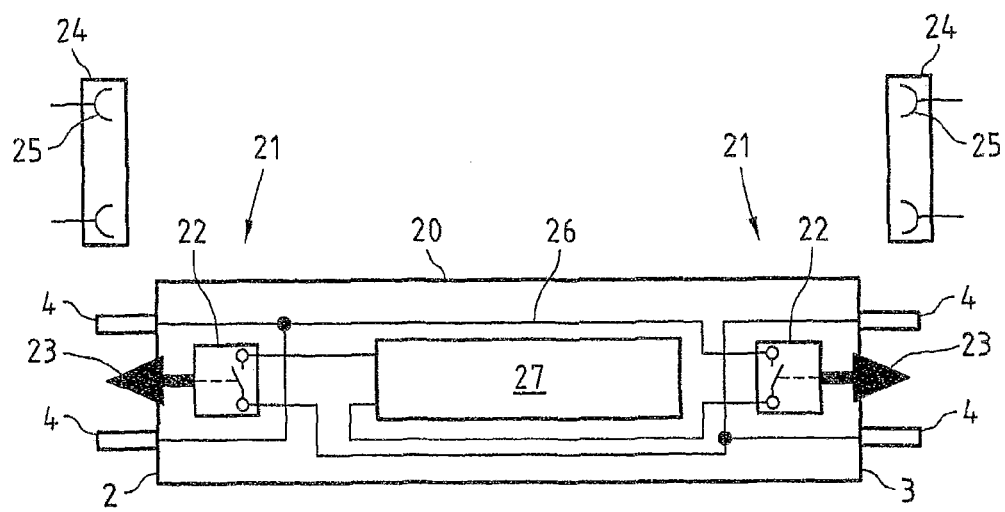
Figure 5B:
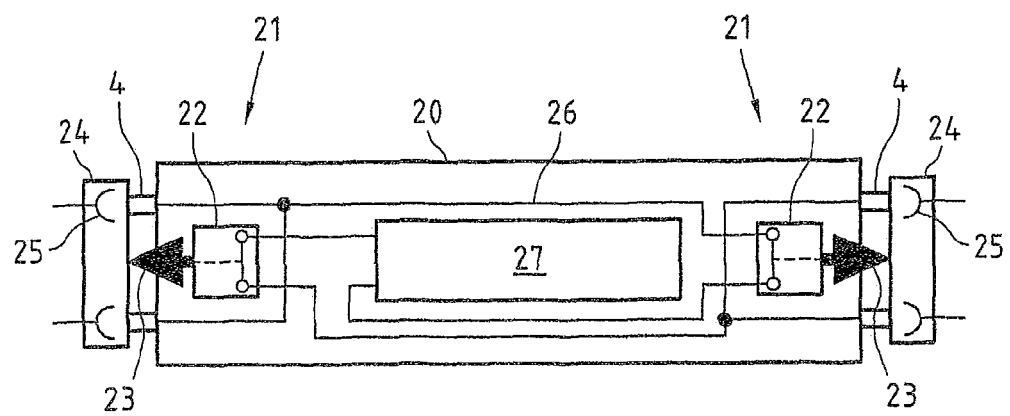

FIG. 5 shows a lamp 20 with protective devices 21 in the form of mechanically operable pressure switches 22, which in the lamp shown and in this respect preferred are in the form of pressure buttons. FIG. 5A shows the protective device 21 in an activated position with opened mechanically operable pressure switch 22 in the dismantled state of the lamp 20. FIG.

5B shows the protective device 21 in a deactivated position with closed mechanically operable pressure switch 22 in the assembled state of the lamp 20. The mechanically operable pressure switch 22 comprises a switching element 23, which projects outwards from the contact module 2, 3 between the two electrical contacts 4. The switching element 23 is of conical shape, so that during insertion of lamp 20 in a lampholder 24 the switching element 23 is forcibly pressed inwards and thus actuates the mechanically operable pressure switch 22.

If the lamp 20 is inserted in the lampholder 24 and if the electrical contacts 4 are connected to the electrical contacts 25 of the lampholder 24, the switching element 23 is pressed inwards positively, i.e. pressed in, and in this way closes the mechanically operable pressure switch 22. A circuit 26 is closed, which supplies current to the light-emitting unit 27 provided in the lamp 20.

In the lamp 20 shown and in this respect preferred, each of the two contact modules 2, 3 is assigned a protective device 21 in the form of a mechanically operable pressure switch 22. The two mechanically operable pressure switches 22 are connected together and to the light-emitting unit 27 in such a way that the circuit 26, in which the light-emitting unit 27 is provided, is not closed until both pressure switches 22 are closed by inserting the lamp 20 in the lampholder 24. This interconnection of the mechanically operable pressure switches 22 together ensures that the contact voltage of a contact module 2, 3 not yet inserted in the lampholder 24 does not exceed a predetermined limit in the partially assembled state. The two mechanically operable pressure switches 22 are preferably spring-loaded, so that the protective devices 21 return automatically to the activated position on removing the lamp 20 from the lampholder 24.

Figure 6A:
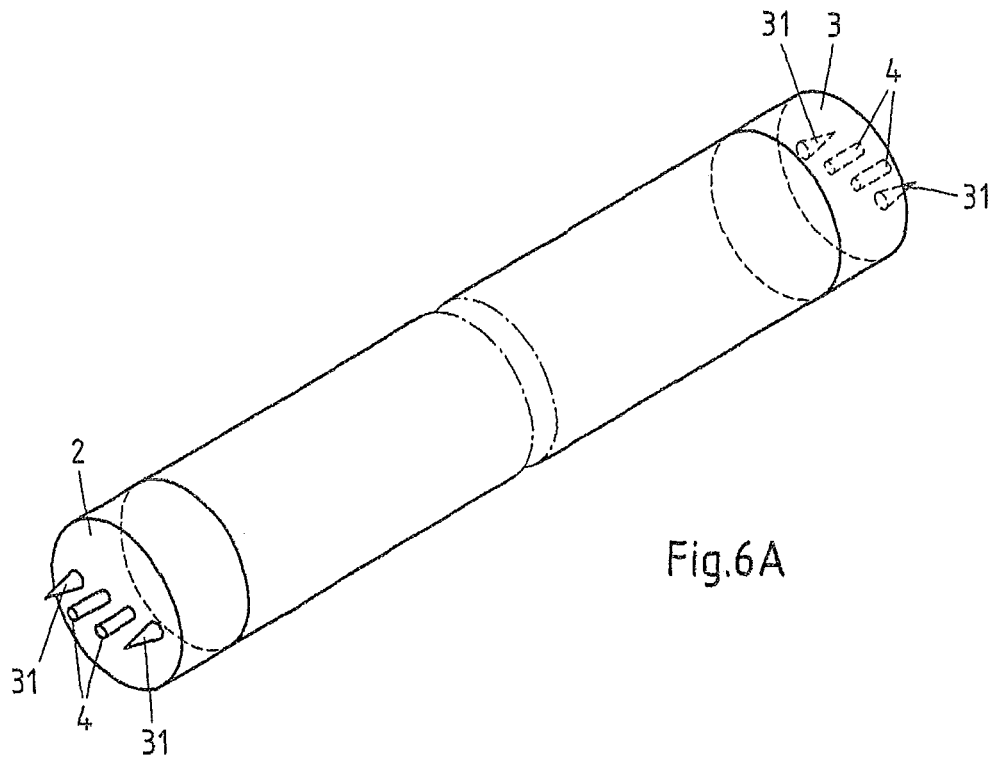
Figure 6B:
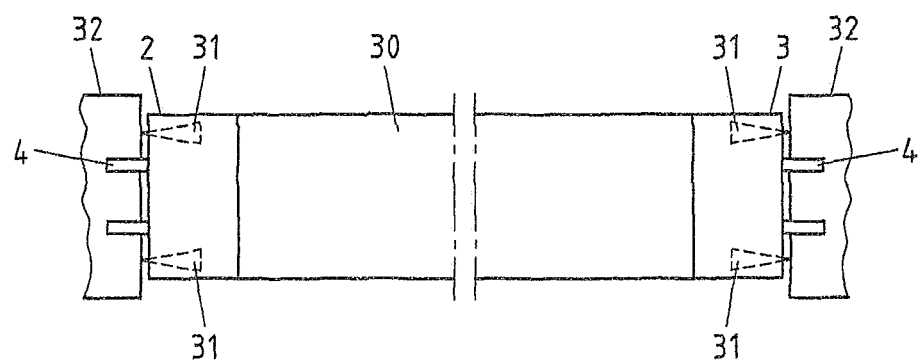

FIG. 6A shows a lamp 30 with two switching elements 31 per contact module 2, 3. In this case each switching element 31 can be connected to a separate mechanically operable pressure switch. However, it is also possible for both switching elements 31 of a contact module 2, 3 to be connected to a single mechanically operable pressure switch. The at least one mechanically operable pressure switch is then closed depending on the arrangement of the switching elements 31, when one of the switching elements 31 or both switching elements 31 are pressed in during insertion of the lamp 30 in a lampholder 32. For this, the switching elements 31 are preferably spring-loaded, so that they can be pressed inwards against a spring force. FIG. 6B shows the lamp 30 in an assembled state. Through contact with the lampholder 32, in the assembled state each of the switching elements 31 is pressed inwards, so that the mechanically operable pressure switches of the contact modules 2, 3 are closed.

In the lamp shown and in this respect preferred, the switching elements 31 can alternatively be provided at any point in the segments 33 shown in FIG. 6C, wherein in each of the two segments 33 a switching element 31 must be provided. This ensures that the switching elements 31 are outside of the electrical contacts 4 of the respective contact module 2, 3. This arrangement of the switching elements 31 ensures that the switching elements 31 of a contact module 2, 3 are not pressed inwards until the corresponding contact module 2, 3 has already been inserted so far into the lampholder 32 that inadvertent touching of the electrical contact 4 of the corresponding contact module 2, 3 is precluded.

FIG. 6D shows a contact module of a protective device 36, which differs from the protective device shown in FIG. 6C in that outside of the segments 33 and laterally to the contacts 4, two further switching elements 31 are provided, wherein in each case a switching element 31 is arranged on either side of the connecting line between the contacts 4. This increases the safety, in that corresponding switching elements 31, if not absolutely all switching elements 31, are only pressed-in in a position in which the user cannot inadvertently touch the contact 4 of the corresponding contact module 2. If not all switching elements 31 of a contact module 2 have to be pressed in to deactivate the protective device, it is possible for a plurality of mechanically operable switches to switch in parallel, to close the circuit comprising the light-emitting unit. If, however, all switching elements 31 of a contact module 2 must be pressed in, for the protective device to go to the deactivated position, the corresponding mechanically operable switches must be arranged in series.

FIG. 6E shows the lamp 30 in a lampholder 34 with a slot 35 for receiving the electrical contacts 4. As the electrical contacts 4 and the switching elements 31 of the mechanically operable pressure switch are arranged in a row, the switching elements 31 must in this case be made wide enough so that despite the slot 35 of the lampholder 34 they are pressed in far enough to close the mechanically operable pressure switch or switches. Moreover, the switching elements 31 get narrower towards their free ends, therefore the switching elements 31, during insertion of the corresponding contact module 2 into the lampholder, do not jam in the slot 35. The switching elements 31 are pressed in through the taper and do not block the further insertion of the contact module 2.

Figure 7A:
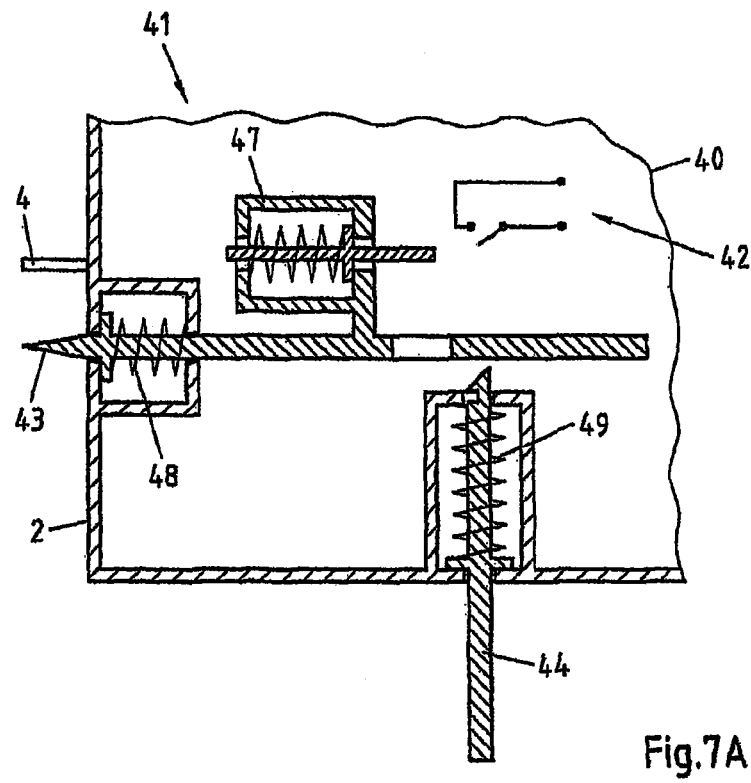
Figure 7B:
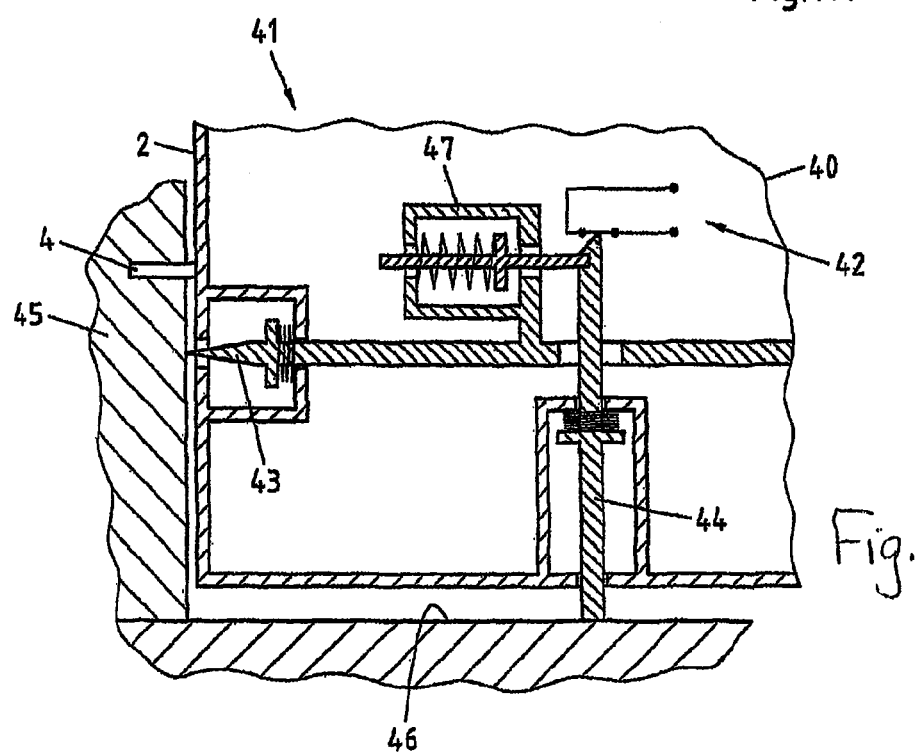

FIGS. 7A and 7B show a detail of a lamp 40, in which the protective device is configured in the form of a mechanically operable pressure switch. The protective device 41 further comprises two switching elements 43, 44, which project outwards in different spatial directions from the housing of lamp 40. Each of the two switching elements 43, 44 is spring-loaded in such a way that the switching elements 43, 44 are pressed outwards on account of the spring force. The first switching element 43 projects outwards parallel to the electrical contacts 4 of the corresponding contact module 2 opposite the latter. The second switching element 44 projects normally to the first switching element 43 opposite the edge of the lamp 40.

During insertion of the corresponding contact module 2 in a lampholder 45 of a luminaire, the first switching element 43 is pressed inwards automatically. In this position, the second switching element 44 is released, and is also pressed inwards. This is the case when the corresponding contact module 2 is fully inserted into the lampholder 45. The second switching element 44 then rests on an internal surface 46 of the lampholder 45 or of the luminaire and consequently is pressed in. The second switching element can also be intended for manual pressing-in, after the lamp is inserted in the lampholder. The second switching element is then preferably easily accessible from outside. In the pressed-in state of the second switching element 44 this comes into contact with the mechanically operable pressure switch 42 and closes it. In the corresponding position of the second switching element 44 this engages with a spring-loaded locking element 47, which locks the second switching element 44 in its position.

The locking element 47 is connected to the first switching element 43, so that the locking element 47 and the second switching element 44 come out of engagement as soon as the first switching element 43 is no longer pressed inwards through the lampholder 45. This is the case when dismantling the corresponding contact module 2. The locking element 47 is then pushed outwards together with the first switching element 43 on account of the spring force of the corresponding elastic means 48.

Then the second switching element 44, which now no longer rests on the lampholder 45, also returns to the starting position on account of the spring force of the corresponding elastic means 49, so that the mechanically operable pressure switch 42 is opened. The mechanically operable pressure switch 42 is connected electrically to the at least one contact 4 of the corresponding contact module 2, so that a contact voltage is applied on the at least one electrical contact 4 of the corresponding contact module 2, which does not exceed a predetermined limit when the mechanically operable pressure switch 42 is open. Touching by the user can then be regarded as harmless.

FIGS. 8A to 8C show a lamp 50 with a protective device 51 on each of the two contact modules 2, 3 in the form of a mechanically operable rotary switch 52. This configuration of the lamp 50 is desirable when the lamp 50 must for example be turned through 90° to produce electrical contact after insertion in a lampholder. FIG. 8A shows the protective devices 51 in an activated position. In this position, the lamp 50 is pushed into a lampholder in the direction shown by the arrow P1. Then the lamp 50 is turned corresponding to the direction of the arrow P2 shown in FIG. 8B, to make contact between the electrical contacts 4 of the contact modules 2, 3 and the electrical contacts of the lampholder. In this position the mechanically operable rotary switches 52 are in an open position.

If the lamp 50 is turned further, the outer segments 53 of the mechanically operable rotary switches 52 retain their position, whereas the internal segments 54 of the mechanically operable rotary switches 52 together with the rest of the lamp 50 are turned further in the direction of the arrow P2. Through this additional rotating movement, the mechanically operable rotary switches 52 are closed. In the position of the mechanically operable rotary switches 52 shown in FIG. 8C, these can be locked by means of locking devices 55 that are to be actuated automatically or manually.

Alternatively it could also be envisaged that the rotation of the lamp after insertion in the lampholder leads to closure of the rotary switch. The electrically conducting contact between the contacts and the lampholder is then only achieved through further rotation of the lamp.

In the lamp shown and in this respect preferred, the light-emitting unit 56 is formed from a large number of LEDs 57. In the final position of the lamp 50, in which the protective devices 51 are provided in the deactivated position, the LEDs 57 are oriented in the desired direction of emission opposite the lampholder.

Figure 9B:
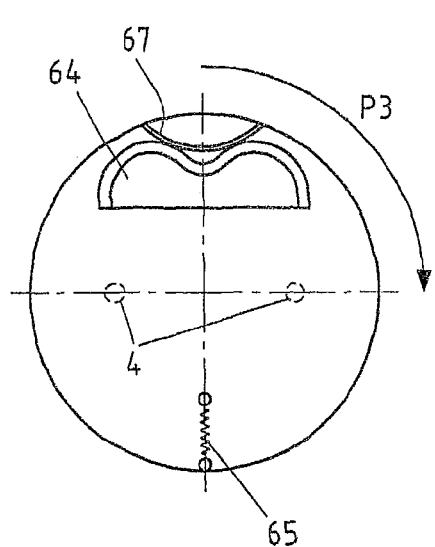
Figure 9A:
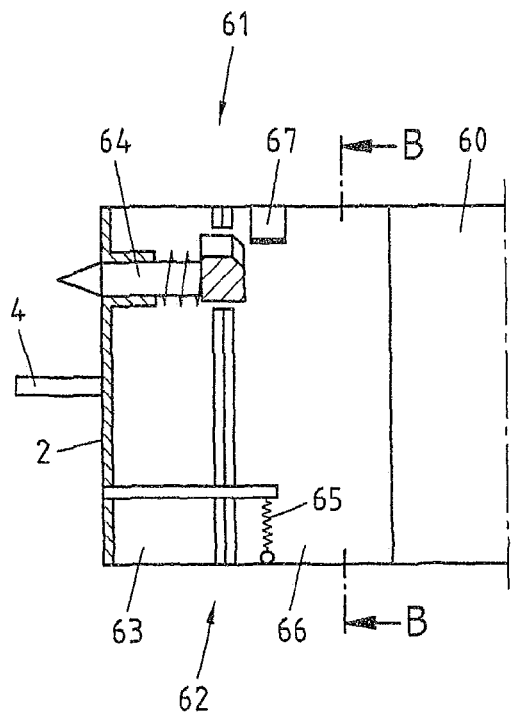
Figure 9C:
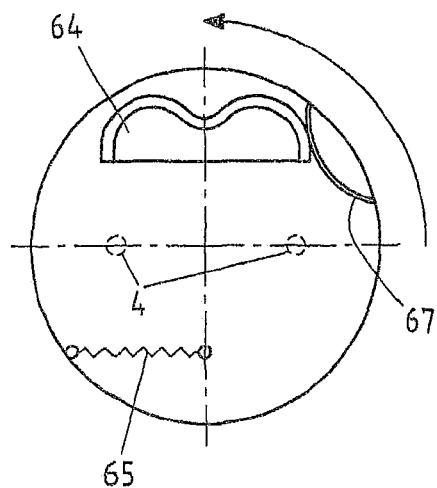

FIGS. 9A to 9C show a lamp 60 with protective devices 61 in the form of mechanically operable rotary switches 62. The lamp 60 is shown in longitudinal section in FIG. 9A. FIG. 9B shows the lamp in a sectional view in plane B-B of FIG. 9A with the pressure switch open, whereas FIG. 9C shows the detail according to FIG. 9B with the rotary switch closed.

The rotatable outer segments 63 of the mechanically operable rotary switches 62 have a pin-shaped switching element 64, which can be pressed inwards against a spring force. Furthermore, the rotatable segments 63 of the mechanically operable rotary switches 62 are connected via an elastic element 65 to a fixed segment 66 of the corresponding mechanically operable rotary switch 62. This elastic element 65 ensures that the rotatable segments 63 of the mechanically operable rotary switches 62 occupy a defined location in a starting position.

When the lamp 60 is inserted in a lampholder the pin-shaped switching element 64 bears on the lampholder and is pressed inwards. In this position the switching element 64 engages under an elastic element 67 of the fixed segment 66 of the rotary switch 62. For starting up the lamp 60 this must be turned further in the position inserted in the lampholder corresponding to the direction of the arrow P3, wherein the elastic element 67 of the fixed segment 66 of the mechanically operable rotary switch 62 is pressed together. On completion of the rotating movement, the elastic element 67 of the fixed segment 66 of the mechanically operable rotary switch 62 goes back to its starting position. In this position the rotatable segment 63 of the mechanically operable rotary switch 62 is locked against inadvertent turning back.

When removing the lamp 50 from the lampholder, the spring-loaded, pin-shaped switching element 64 is moved outwards and releases the elastic element 67 of the fixed segment 66 of the mechanically operable rotary switch 62, so that the rotatable segment 63 of the mechanically operable rotary switch 62 is turned back automatically to the starting position by the spring force of the elastic means 65 connecting the two segments 63, 66 of the mechanically operable rotary switch 62.

Figure 10:
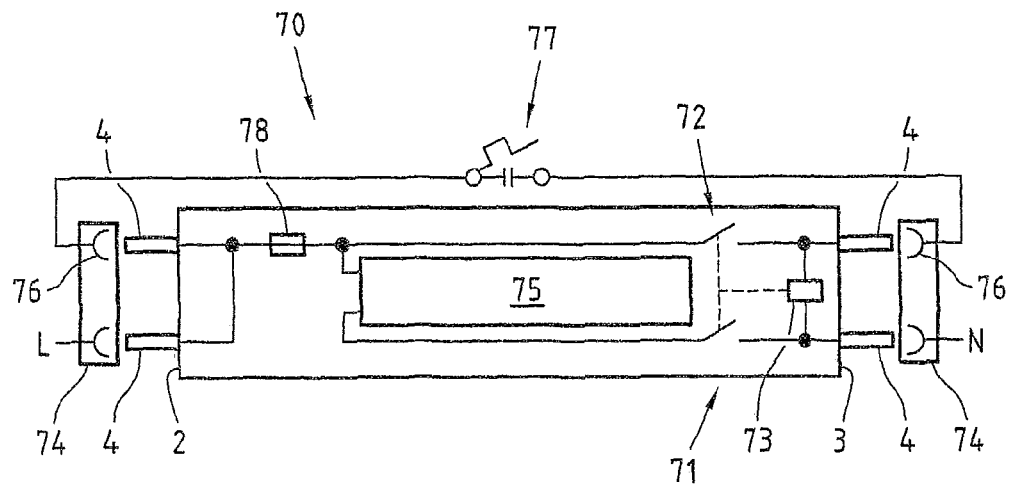

In FIG. 10, a lamp 70 is provided with an electrically operable switch 71 as protective device 72. In this configuration of the lamp 70, a single bipolar-switching, electrically operable switch 71 is sufficient to protect both contact modules 2, 3 against an inadvertent electric shock. The electrically operable switch is connected to a sensor element 73 and the contacts 4 of the two contact modules 2, 3 in such a way that current only flows via the sensor element 73, which can be a relay or a relay, when the lamp 70 with both contact modules 2, 3 is inserted in a lampholder 74. If current flows through the sensor element 73, it closes the electrically operable switch 71 automatically and the light-emitting unit 75 is supplied with current. The unit between sensor element 73 and electrically actuated switch 71 is locked until the lampholder 74 is isolated from the supply, and is preferably designed as a relay.

So that a short-circuit cannot occur if the lamp 70 is inadvertently inserted upside down in the lampholder 74 shown, a fuse 78 is provided between the contact modules 2, 3. Regardless of the installation position in which the lamp 70 is inserted in the lampholder 74, a dubious operating state for the installer and the lampholder 74 etc. is reliably prevented. In the worst case the fuse 78 must be replaced, for which the fuse 78 can be easily reached from outside and replaced.

The electrically operable switch 71 shown in FIG. 10 is only closed when the lamp 70 is inserted in a lampholder 74, where two electrical contacts 76, which are assigned to contact modules 2, 3 that are opposite one another, are connected together electrically. A starter 77 can remain in the system or alternatively can be replaced with a bridge.

If this is not so, the protective device 71' can be provided as a high-ohmic connector between the contact modules, which is conducting on insertion in the lampholder 74'. In the exemplary embodiment according to FIG. 11, the sensor element 73 controlling the electrically operable switch 72' is provided in this connector, which is sufficiently high-ohmic so that there is no risk of an electric shock for the installer when inserting the lamp into the lampholder. When both contact modules 2, 3 of the lamp have been inserted in the corresponding lampholder 74, current flows through the sensor element 73 and it automatically closes the electrically operable switch 72', so that the light-emitting unit 75 is supplied with current in the corresponding, secondary circuit. The sensor element 73 and the electrically operable switch 72 are arranged to be locking under load.

Figure 12:
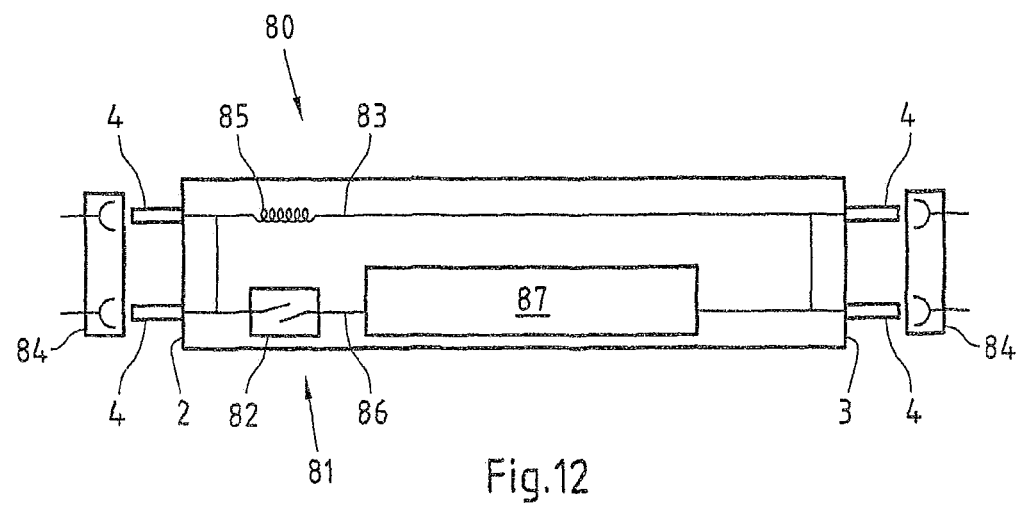

FIG. 12 shows a lamp 80 with a protective device 81 in the form of a magnetically operable switch 82. The protective device 81 comprises a primary circuit 83, which on insertion of the corresponding contact module 2, 3 in the lampholder 84 is supplied with current. In the primary circuit 83 there is a coil 85, which in the current-carrying state produces a magnetic field. This magnetic field closes the adjacent magnetically operable switch 82. As a result, a secondary circuit 86 is closed, and then supplies current to the light-emitting unit 87.

Figure 13:
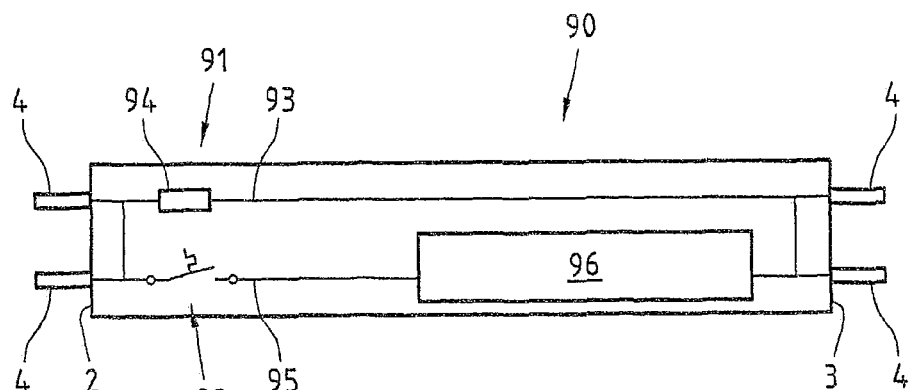

FIG. 13 shows a lamp 90 with a protective device 91 comprising a thermally operable switch 92. It is not until both contact modules 2, 3 are inserted in the lampholder of a luminaire that there is a voltage drop via a primary circuit 93. This voltage drop causes heating of a heating resistor 94 in the primary circuit 93. Owing to the heat produced by the heating resistor 94, an adjacent thermally operable switch 92 is closed. This closes a secondary circuit 95, in which the light-emitting unit 86 of the lamp 90 is provided.

Figure 14:
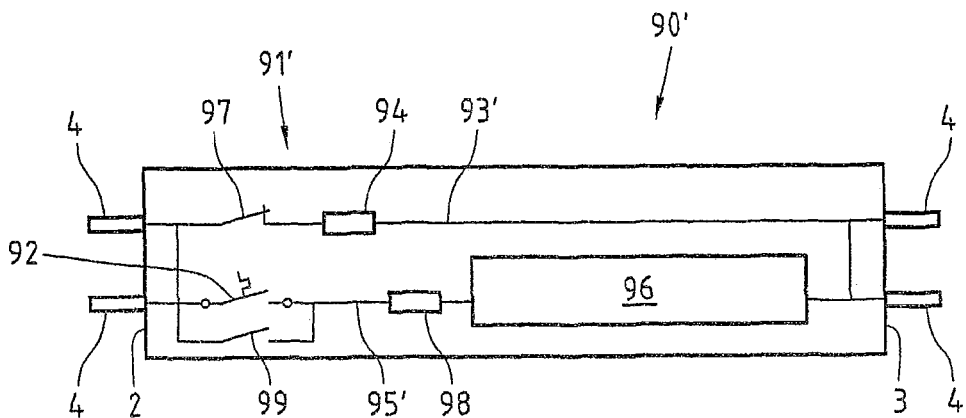

FIG. 14 shows, as a modification of the representation in FIG. 13, a lamp 90' with a protective device 91' in the form of a thermally operable switch 92. In contrast to the lamp 90 according to FIG. 13, a switch 97, which is closed in the initial state, is provided in the primary circuit 93'. When both contact modules 2, 3 of the lamp 90' have been inserted in the lampholder, current flows through the heating resistor 94 and it is heats up. Consequently, the adjacent thermally operable switch 92 is closed. As a result, the secondary circuit 95' is closed, since along with the light-emitting unit 96 there is also a sensor element, for instance in the form of a relay 98. This sensor element 98 provides locking of the secondary circuit 95', by opening the switch 97' in the primary circuit 93' and closing a switch 99 arranged in parallel to the thermally operable switch 92. During operation of the lamp 30', finally a parallel flow of current through the heating resistor 94 is prevented.

Figure 11:
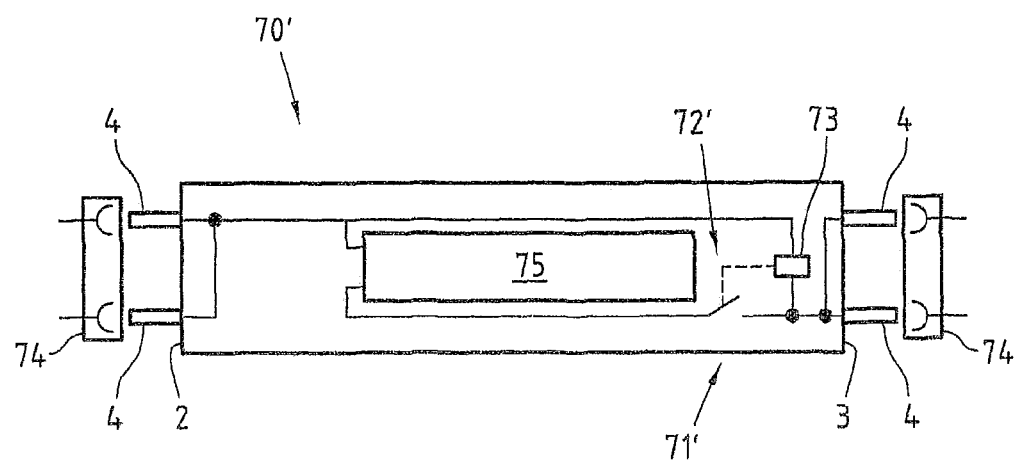
Figure 15:
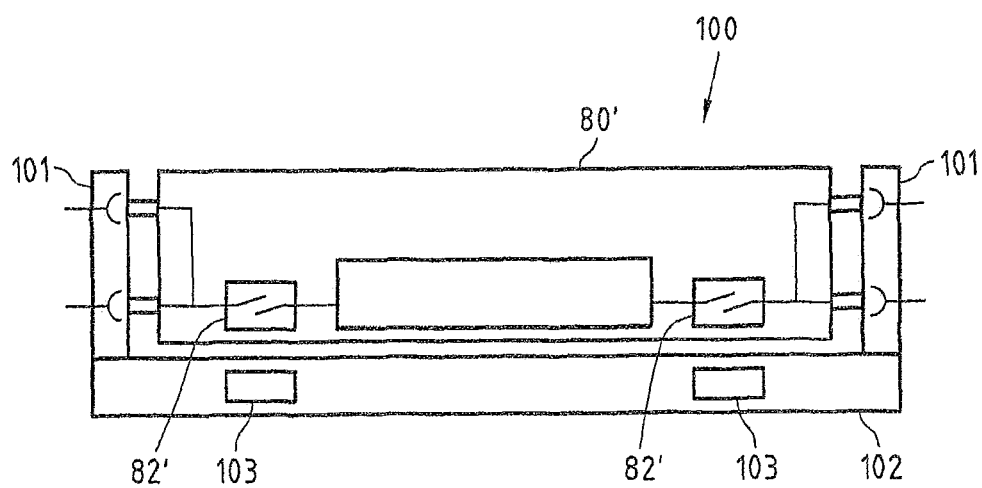

FIG. 15 shows a system 100 comprising a lampholder 101 and a lamp 80', which is of similar design to the lamp 80 according to FIG. 11 and has two magnetically operable switches 82'. The lampholder 101 or luminaire 102 which has the lampholder 101 has two permanent magnets 103, which in the assembled state of the lamp 80' are arranged near the magnetically operable switch 82' (reed contacts), so that the magnetically operable switches 82' are closed.

Figure 16:
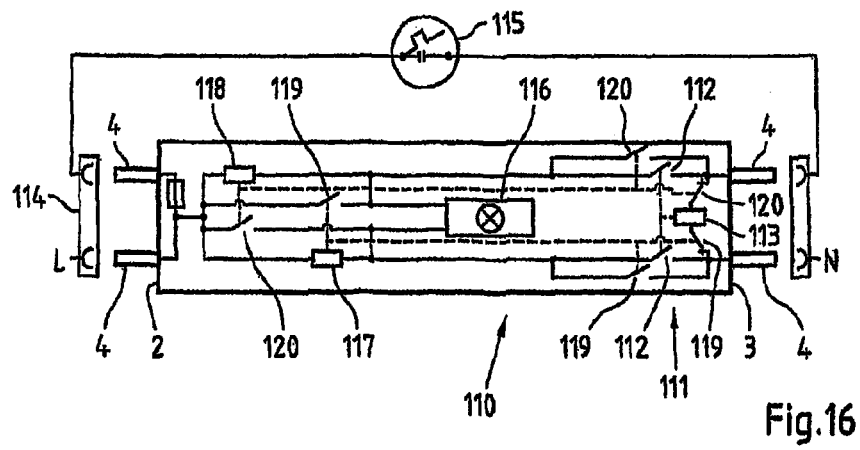

FIG. 16 shows a lamp 110, which reliably prevents formation of parasitic voltages from one to the other contact module 2, 3, which would mean the risk of electric shock for the installer. For this, the lamp 110 has a protective device 111, which comprises a two-pole switch 112 and a sensor element 113. In the lamp 110 shown and in this respect preferred, the sensor element 113 and the two-pole switch 112 are combined in a relay, which can be a low-voltage relay. With two-sided insertion of the lamp 110 in the lampholder 114, a primary circuit closes between in each case a contact 4 of a contact module 2, 3 and the other contact 4 of the contact module 2, 3 and via the starter 115 of the lampholder 114 from one to the other contact module 2, 3. Through closure of the primary circuit there is a voltage drop across the sensor element 113, regardless of how the lampholder 114 is wired per se (cf. FIG. 1A to 1D) and closes the assigned two-pole switch 112 and therefore a secondary circuit for operating the light-emitting unit 116.

Voltage is now also applied to the two further sensor elements 117, 118. The sensor elements 117, 118 are assigned three switches 119, 120 and are configured in such a way that a sensor element 117, 118 only closes the associated switches 119, 120 when the sensor element 119, 120 is arranged in parallel but not in series with the sensor element 113 of the primary circuit. Therefore in the installation position shown in FIG. 16 the sensor element 117 closes the switch 119, so that the light-emitting unit 116 is energized. The lamp 110 thus adapts independently to the respective installation position of the lamp 110 relative to the lampholder or to the lampholder used in each case (cf. FIG. 1A to 1D), without requiring intervention on the part of the installer. Simultaneously, the sensor element 113 is de-energized, so that the switches 112 open, as the position of the switches 112 leads to a locking of the secondary circuit. As a result, during operation of the light-emitting unit 116 the starter opens and therefore can neither cause damage or reduce the electrical power.

Figure 17:
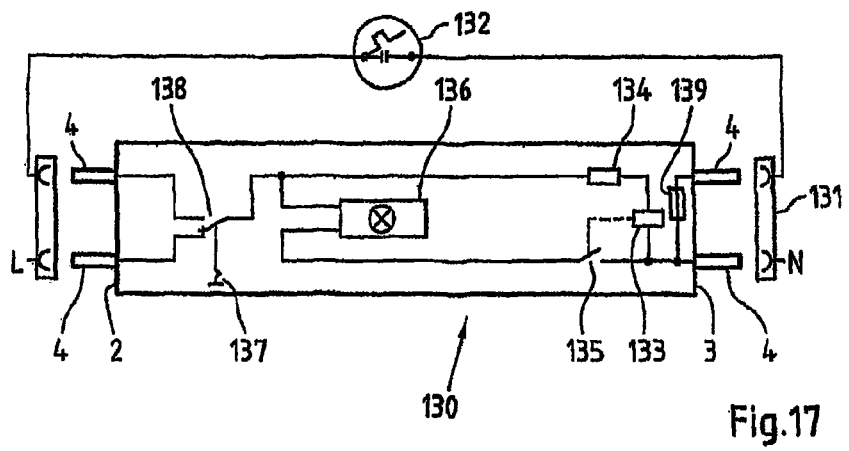

FIG. 17 shows a lamp 130, which prevents formation of parasitic voltages from one contact module 2, 3 to the opposite contact module 2, 3, which could endanger the installer of the lamp 130. The lamp 130 can even be operated with an undesirable installation position of the lamp 130 relative to the lampholder 131. The lamp 130 can be operated with the usual lampholders known from the prior art (cf. FIG. 1A to 1D), although the lamp 130 does not require a starter 132 or a starter bridge. The two contact modules 2, 3 are connected together via a primary circuit and a secondary circuit. With the resistance of the sensor element 133 and the additional resistor 134, the primary circuit is sufficiently high-ohmic (>2 M$\Omega$), so that the installer need not fear an electric shock during insertion of the lamp 130 in the lampholder 131. The secondary circuit is at first opened by the switch 135 during insertion of the lamp 130 in the lampholder 131.

If after insertion of the lamp 130 there is a voltage drop across the primary circuit, the switch 135, electrically controlled via the sensor element 133, is closed, so that the light-emitting unit 136 provided in the secondary circuit lights up. This ensures that the secondary circuit is open in the partially assembled state of the lamp 130. Therefore the sensor element 133 and the switch 135, which can be combined in a relay, are components of a protective device for preventing the unintentional formation of parasitic voltages from one to the other contact module 2, 3.

If the contacts on the left of the lampholder 131 were to be exchanged relative to FIG. 17 or if the lamp 130 were to be upside down relative to the representation in FIG. 17, after insertion of the lamp 130 in the lampholder 131 at first no current would flow via the primary circuit. However, this would be judged by the installer as a signal and request to reposition a switch 138 that is to be actuated mechanically via a tripping mechanism 137, for which it would not be necessary to remove the lamp 130 from the lampholder 131. As a result there would be a voltage drop across the primary circuit, the secondary circuit would be closed and the light-emitting unit 136 would light up.

If the lamp 130 shown in FIG. 17 is inadvertently inserted in a lampholder in which the mains voltage is applied to the two contacts on one side of the lampholder, no critical operating state can arise, because depending on the installation position of the lamp 130, either the switch 138 or the fuse 139 would prevent a short-circuit.

Figure 18:
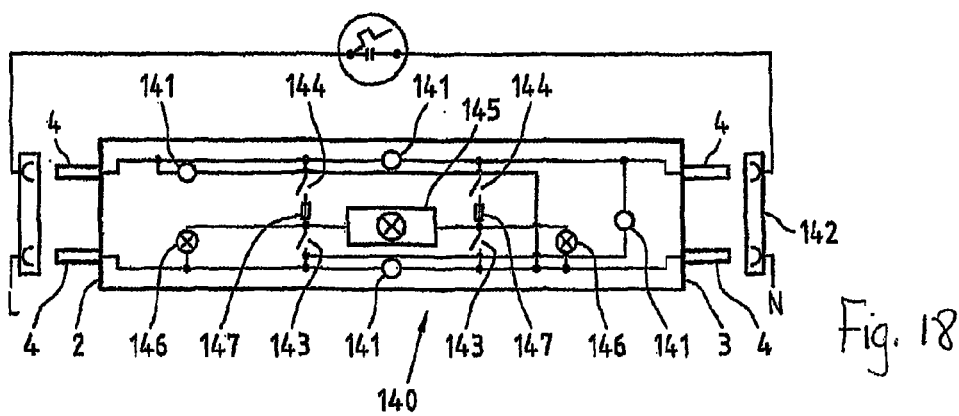

FIG. 18 shows a lamp 140, which comprises four measuring devices 141, each detecting the voltage drop on another pair of contacts 4 of the lamp 140. The pairs of contacts are composed in each case of a contact 4 of one contact module 2 and a contact 4 of the other contact module 3. However, this would not be absolutely necessary for the function of the lamp 140. A conclusion can be drawn about the installation position of the lamp 140 or about the wiring of the lampholder 142 based on the magnitude of the voltage drop. It can also be ascertained whether the lampholder 142 is connected in series or in parallel to at least one further lampholder. A logic circuit, not shown in detail, is provided, which according to predetermined criteria, with reference to the voltage drop determined, ensures that electrically operable switches 143, 144 provided in the lamp 140 are closed appropriately, in order to operate the lamp 140 appropriately. Without the measuring devices 141 determining predetermined voltage drops, the position of the switch 143 prevents a low-ohmic connection between the two contact modules 2, 3 of the lamp 140, so that the installer cannot receive an electric shock during insertion of the lamp 140.

In the installation position shown in FIG. 18, a measuring device 141 would measure the full mains voltage and the logic circuit would recognize that the lamp 140 is inserted in the lampholder 142 on both contact modules 2, 3 and would then close the switches 143. Consequently, the light-emitting unit 145 would light up. In the state of the lamp 140 not fully inserted in the lampholder 142, the switches 143, 144 are open, so that in this case there are only high-ohmic connections via the measuring devices 141 between the contact modules 2, 3. This means that the switches 141, 143 are components of the protective device against formation of parasitic voltages from one to the other contact module 2, 3 in the partially assembled state of the lamp 140.

Figure 19A:
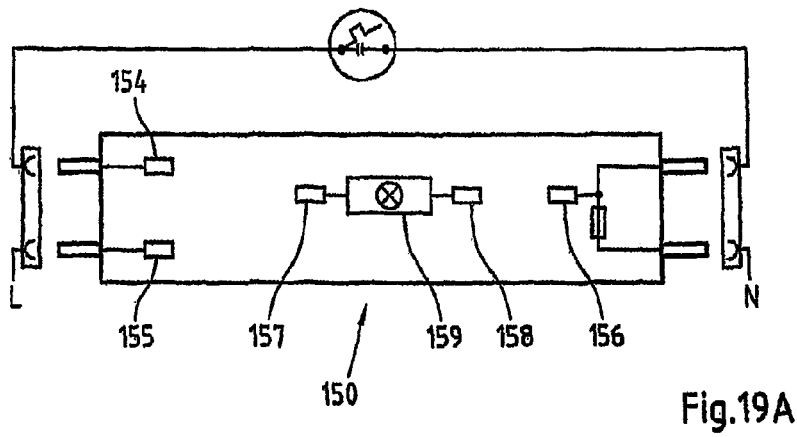
Figure 19B:
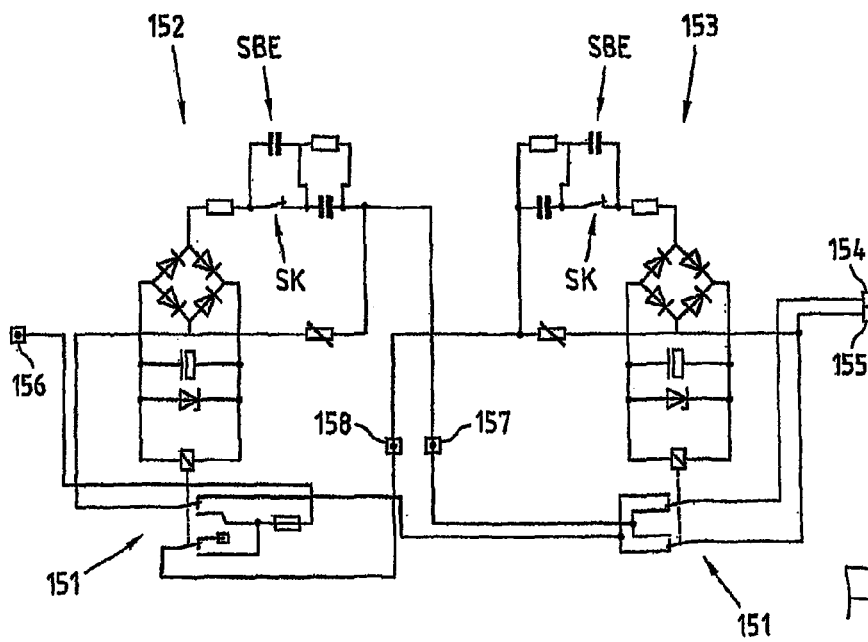

For the case when the mains voltage is only applied to the contacts 4 of one contact module 2, 3, which is only the case with specially wired lampholders, for instance for the operation of conversion LED units, one of the signal generators 146, which in the present case are optical signal generators in the form of light-emitting units, preferably LEDs, will be connected into the circuit. This shows the installer that the lamp 140 is not intended to be operated with this lampholder. The risk of electric shock for the installer is also ruled out in this case. The fuses 147 are provided to prevent a short-circuit in case of faulty control of the switches 143, 144 by the logic circuit. FIG. 19A shows a lamp 150, which has two low-voltage relays 151 with electronic control gear 152, 153 according to the circuit diagram shown in FIG. 19B. The circuit diagram is shown with usual international symbols familiar to a person skilled in the art, so that a detailed explanation of the circuit diagram is unnecessary. The circuit diagram is provided between the contacts 154-158 shown in FIG. 19A, which are also shown in FIG. 19B and ensure proper, safe operation of the light-emitting unit 159. The relays 151 form part of the protective device against formation of parasitic voltages from one to the other contact module 2, 3, which would endanger the installer.

Electronic control gear according to FIG. 19B or in some other configuration can also be provided with other interconnections of the lamp, even if this is not mentioned explicitly each time. In particular, electronic control gear is used together with low-voltage relays, for instance to save space. The electronic control gear then serves for supplying the low voltage for switching the low-voltage relays. The electronic control gear can be integrated both in the lampholder and in the lamp. However, it is advisable to incorporate the electronic control gear in the lamp, as this can then be operated with various, ordinary lampholders.

In the electronic control gear shown and in this respect preferred, switching contacts SK are provided, which are connected via at least one of the low-voltage relays 151 shown. When the protective device—in normal operation—goes into the non-activated position, the switching contacts SK are opened. Therefore a power-reducing element SBE is included, comprising capacitors for the ballast system shown and in this respect preferred. Lowering of the current with the protective device in the deactivated position is possible because the holding voltage of a relay as a rule is much less than the voltage required for breaking the relay. Consequently, with the ballast system described above, the power loss during normal operation of the lamp 150 can be reduced considerably.

Figure 20:
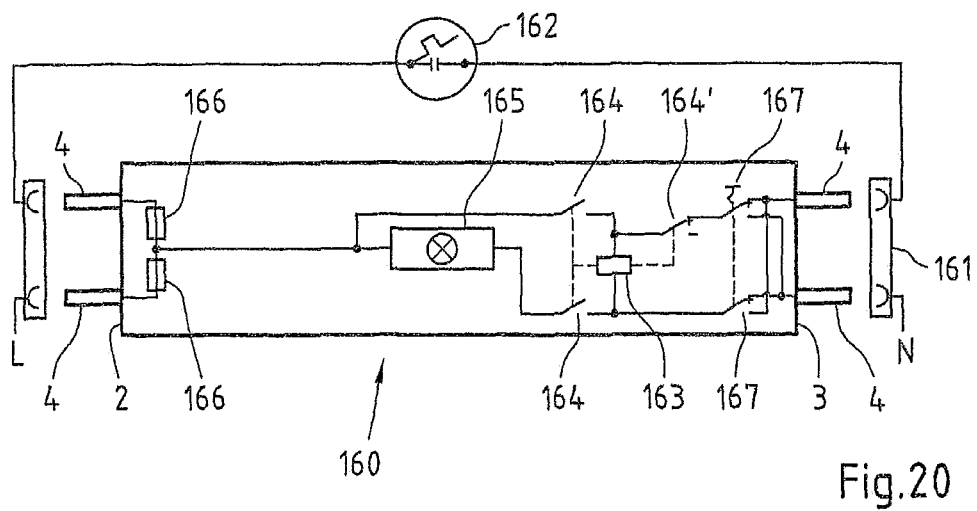

FIG. 20 shows a lamp 160, which in the inserted state in the lampholder 161, closes a primary circuit with the lampholder 161 and the starter 162 provided in the lampholder 161. In the primary circuit there is a sensor element 163, which following closure of the primary circuit closes a two-pole switch 164 and opens a one-pole switch 164'. As a result, the primary circuit is opened and the secondary circuit, in which the light-emitting unit 165 is located, is closed. Moreover, locking of the secondary circuit is achieved. The combination of sensor element 163 and two-pole switch 164 forms part of the protective device, which protects the installer against electric shock in the partially assembled state, because then the secondary circuit through the lamp 160 is open.

The opening of the primary circuit and/or the fuses 166 prevent a short-circuit, which might arise if the lamp 160 were to be inserted upside down, relative to what is shown in FIG. 20, in the lampholder 161 shown there or in a lampholder with different wiring. It can also be envisaged that short-circuiting is not actually prevented but the effect of short-circuiting can at any rate be limited.

If the lamp 160 were to be inserted upside down in the lampholder 161 according to FIG. 20, switching of the one-pole switch 164' would lead to interruption of the secondary circuit. Thus, locking of the secondary circuit would not be achieved, but at most there would be flickering of the light-emitting unit 165. This problem could, however, be countered if the polarity-reversing device 167 for reversing the polarity of the contacts 4 of the right-hand contact module 3 relative to the light-emitting unit 165 is activated via the mechanical switch 168. Then the lamp 160 would function as in the installation position shown in FIG. 20.

Figure 21:
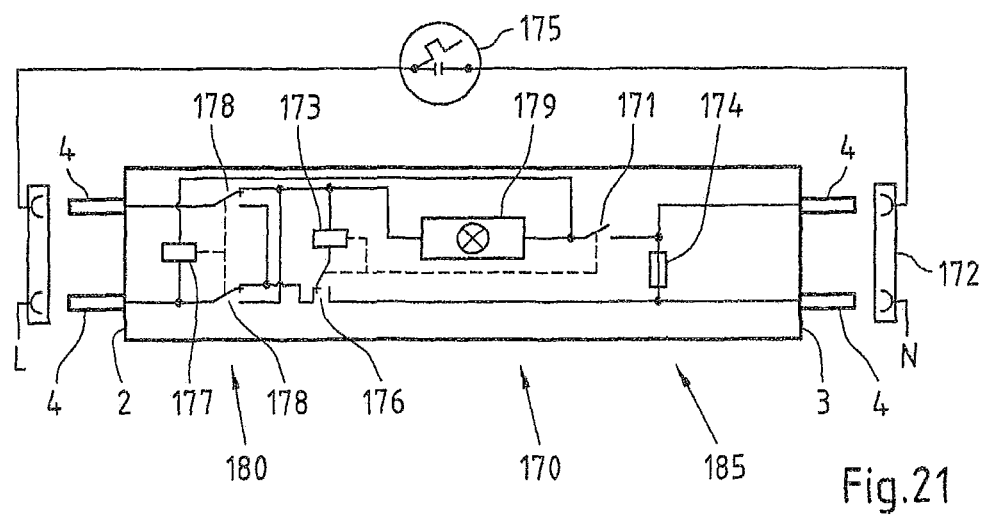

FIG. 21 shows a lamp 170, which can be operated in any installation position with the lampholders provided for operation with fluorescent tubes (cf. FIG. 1A to 1D) and does not expose the installer to the risk of receiving an electric shock when inserting the lamp into the lampholder as a result of formation of parasitic voltages from one contact module 2, 3 to the other contact module 2, 3. Thus, electrical connection in the state with the lamp 170 not fully inserted is prevented by the opened, electrically operable switch 171.

The lamp 170 forms, together with the respective lampholder 172, a primary circuit in which the two contacts 4 of the left contact module 2 are connected together via the sensor element 173 and the two contacts 4 of the right contact module 3 are connected together via the fuse 174. In the primary circuit, the two contact modules 4 are connected together via the lampholder 172 and the starter 175 provided there. The fuse 174 is basically also dispensable if the lamp 170 is only used with lampholders according to FIG. 1A to 1D. If the primary circuit is closed on inserting the lamp 170 in the lampholder 172, the switches 171, 176 are controlled via the sensor element 173. The sensor element 173 and the switches 176, 171 are, in the case of the lamp 170 shown and in this respect preferred, preferably combined in a relay, which is preferably a low-voltage relay with and without ballast system for supplying the low voltage for operation of the low-voltage relay. The relay forms part of the protective device 185.

Then the two sensor elements 173, 177 are energized. Therefore the sensor element 177 switches the two associated switches 178, which leads to polarity reversal of the two contacts 4 of the left contact module 2 relative to the light-emitting unit 179. The sensor element 177 and the switch 178 are, in the lamp 170 shown and in this respect preferred, constructed in common as relays and form a polarity-reversing device 180. The relay can be designed as a low-voltage relay with and without ballast system for supplying the low voltage for operation of the low-voltage relay.

As a result of the polarity reversal of the contacts 4 of the left contact module 2, the sensor elements 173, 177, but no longer the starter 175, are energized. The sensor elements 173, 177 maintain the secondary circuit via the switches 171, 176, 178 (locking). As a result, voltage is applied continuously to the light-emitting unit 179, until the lampholder 172 is de-energized or the lamp 170 is removed from the lampholder 172. The light-emitting unit 179 preferably has one, in particular a plurality of LEDs.

When the lamp 170 in the orientation shown in FIG. 21 is inserted in a lampholder in which the left contacts are exchanged, i.e. the starter is connected to the bottom left lampholder contact (cf. FIG. 1D), or when the lamp 170 is inserted upside down, relative to what is shown in FIG. 21, in the lampholder 172 shown there (cf. FIG. 1B), there is no polarity reversal of the contacts 4 of the left contact module 2 of the lamp 170. The switches 178 and the sensor element 177 remain inactive. Nevertheless, on inserting the lamp 170, first the primary circuit is closed, as already described above. The sensor element 173 now switches the switch 171 to close the secondary circuit between the two contact modules 2, 3. Now voltage is applied not only to the sensor element 173, but also to the light-emitting unit 179.

The secondary circuit is configured to be locking, without requiring polarity reversal of the contacts 4 of the left contact module 2 of the lamp 170. The lamp 170 can thus be operated in all common lampholders for fluorescent tubes (cf. FIG. 1A to 1D), without the installer being exposed to the risk of an electric shock, without the possibility of development of a critical operating state and without requiring the installer's intervention to adapt the internal interconnection of the lamp 170 to the lampholder used or the installation position of the lamp 170.

Even if the lamp 170 is operated with a lampholder on which the mains voltage drops out on the two contacts of one side of the lampholder, no critical operating state in the form of a short-circuit can develop, because a fuse 174 is provided in the bridge between the right-hand contacts 4, and the contacts 4 of the left contact module 2 cannot have a low-ohmic connection.

Figure 22:
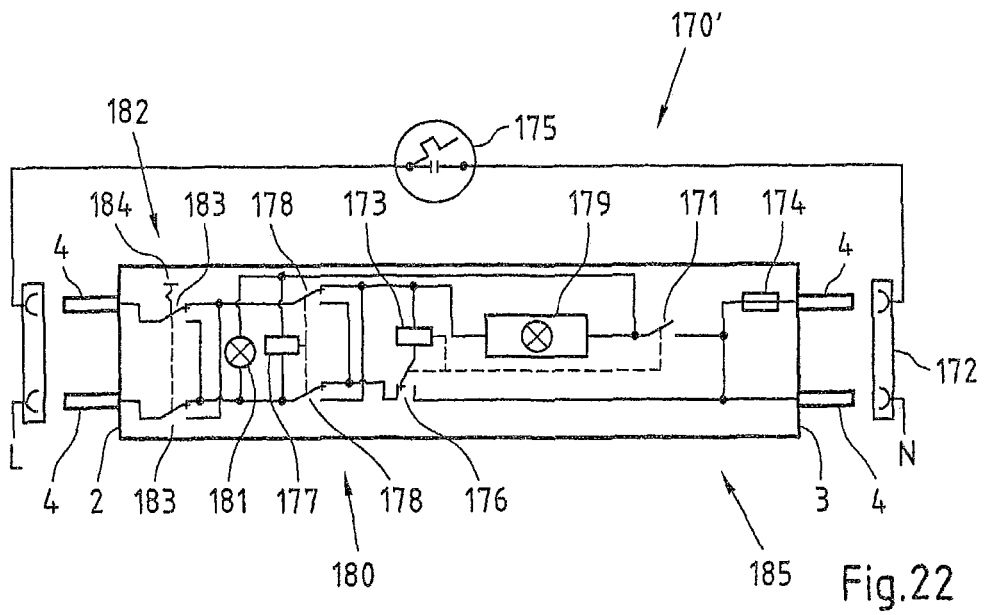

The lamp 170' shown in FIG. 22 is based on the lamp 170 shown in FIG. 21. Additionally, however, yet another polarity-reversing device 182 is provided, to be actuated mechanically by a tripping mechanism 184 for instance in the form of a button or the like, comprising the two-pole switch 183, for reversing the polarity of the contacts 4 of the left contact module 2 relative to the light-emitting unit 179. In addition, a signal generator 181 is connected parallel to the sensor element 177, which in the lamp shown, and in this respect preferred, is a preferably coloured LED. However, other optical or acoustic signal generators would also be conceivable.

In the installation position shown, during insertion of the lamp 170 in the lampholder, the sensor element 173 arranged in the first circuit is energized. Next the switches 171, 176 are tripped by the sensor element 173. Now both sensor elements 173, 177 are energized and the sensor element 177 switches the switches 178 for reversing the polarity of the contacts 4 of the left contact module 2 relative to the light-emitting unit 179. Then along with the light-emitting unit 179, the LED 181 also lights up, to indicate to the installer that in the corresponding operating state both sensors 173, 177 are connected as consumers in the circuit.

To save energy or to keep the losses small, the installer can now actuate, in a known manner, the externally accessible tripping mechanism 184 preferably in the state with the lamp 170 inserted in the lampholder, and thus activate the further polarity-reversing device 182 assigned to the switch 184.

Thus, the contacts 4 of the left contact module 2 are once again exchanged against the light-emitting unit 179. Then the sensor element 177 is no longer energized and the corresponding power loss is saved, without this adversely affecting the operation of the light-emitting unit 179, as the sensor element 173 is still energized, so that locking of the secondary circuit is achieved, ensuring that the light-emitting unit 179 is permanently energized.

The switch 182 is easily accessible in the installed state of the lamp 170'. This avoids having to remove the lamp 170' from the lampholder for operating the switch.

Figure 23:
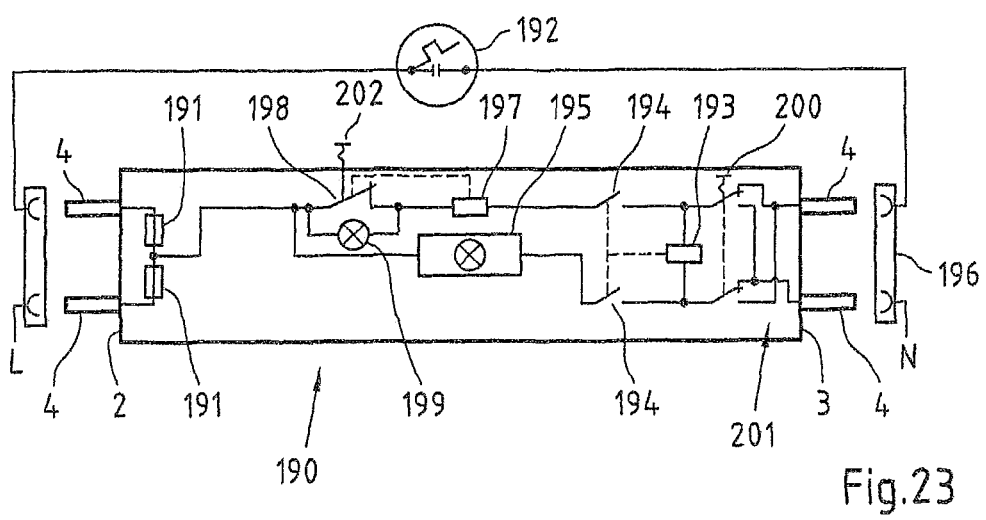

FIG. 23 shows a lamp 190, which on the one hand avoids the formation of parasitic voltages between the contact modules 2, 3 and on the other hand indicates a disadvantageous installation position, without causing damage to the lamp 190 or a critical operating state in the lampholder. In the installation position shown in FIG. 23, by inserting the lamp 190, a primary circuit is closed, which incorporates the two fuses 191, the starter 192 and the sensor element 193. The sensor element 193 now switches the assigned switches 194, which in the lamp 190 shown and in this respect preferred, are combined with the sensor element 173 in a relay, if necessary semiconductor relay and/or low-voltage relay. Therefore it is only in the inserted state of the lamp 190 that the secondary circuit is closed and the light-emitting unit 195 is operated. Therefore the sensor element 193 and the switch 194 or the two-pole switch 194 form part of the protective device, which prevents the risk of the installer receiving an electric shock.

If the lamp 190 were to be inserted upside down in the lampholder 196 relative to what is shown in FIG. 23 or the two right-hand contacts of the lampholder 196 were to be interchanged, the current flowing parallel to the light-emitting unit 195 is far higher than the current flowing through the light-emitting unit 195. This is disadvantageous and leads to the triggering of a sensor element 197 in the form of an electronic measuring device or a thermostatic switch. As a result, a switch 198 is opened and a signal element 199 is activated, which indicates the disadvantageous interconnection. The installer can now actuate, via a switch 200 or some other device, a polarity-reversing device 201 for reversing the polarity of the contacts 4 of the right-hand contact module 3 relative to the light-emitting unit 195. The disadvantageous operating state is corrected and the signal generator 199 can be returned to its starting position by means of a corresponding reset device 202.

The reset device 202 is designed and provided so that the reset device 202 is readily accessible from outside, when the lamp 190 is inserted in the lampholder 196.

Figure 24:
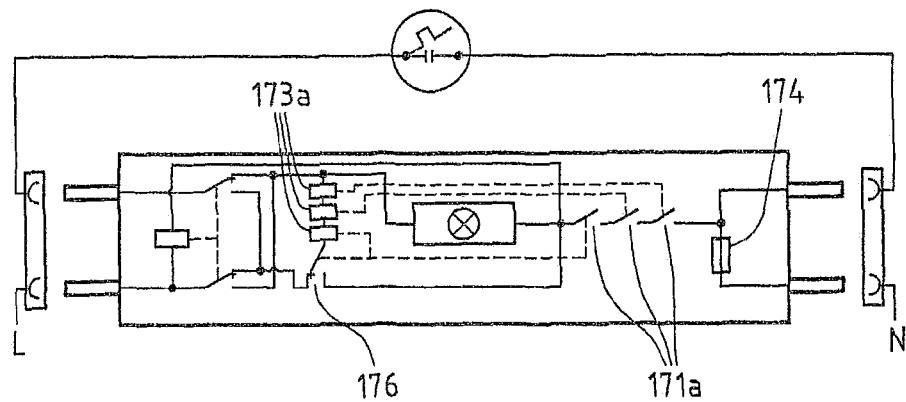

FIG. 24 shows a modification of the lamp 170 from FIG. 21. The same components are given the same reference symbols. In contrast to the lamp 170 shown in FIG. 21, the sensor element 173 has been replaced with the three sensor elements 173a. In addition, the electrically operable switch 171 has been replaced with the three switches 171a, to increase the dielectric strength of the circuit. Moreover, the interconnection has been modified so that the bus between the fuse 174, the contact 4 and the switch 176 has been dispensed with. Instead, there is now a direct electrical connection between the switches 176 and 171a. In this way the total number of switches required for ensuring the required dielectric strength can be reduced. In the present case two switches have been saved in the connection between the switch 176 and the fuse 174. High dielectric strengths can basically be promoted by using so-called reed relays. Other sensor elements are nevertheless possible.

With the plurality of switches 171a, it can moreover be ensured with very high probability that the protective device can be changed from the deactivated position back to the activated position, for renewed protection of the user against an accidental electric shock. Even if one of the switches 171*a* were no longer to open as a result of sticking of the corresponding contacts, the protective device can resume the activated position through the opening of another switch 171*a*. Admittedly the dielectric strength in the activated position of the protective device may be lowered as a result. This can, however, be compensated with appropriate design of the protective device, for example by using another switch. If the dielectric strength is not a limiting factor, two switches arranged in series ought to be sufficient, as sticking of switches is unlikely in the expected service life of the lamp.

As a variant of the lamp shown in FIG. 24, the sensor elements 173*a* could also be connected in parallel to one another, although this is less preferable, because then the current must be divided on the sensor elements 173*a*. Alternatively the sensor elements 173*a* can also be replaced with a single sensor element. If it is only necessary to prevent malfunctions through the sticking of the contacts of the switches 171*a*, for instance welding of the contacts together with formation of a permanent electrical connection, it should be sufficient to provide two switches 171*a*, which are switched by means of a single sensor element 173*a*.

Figure 25:
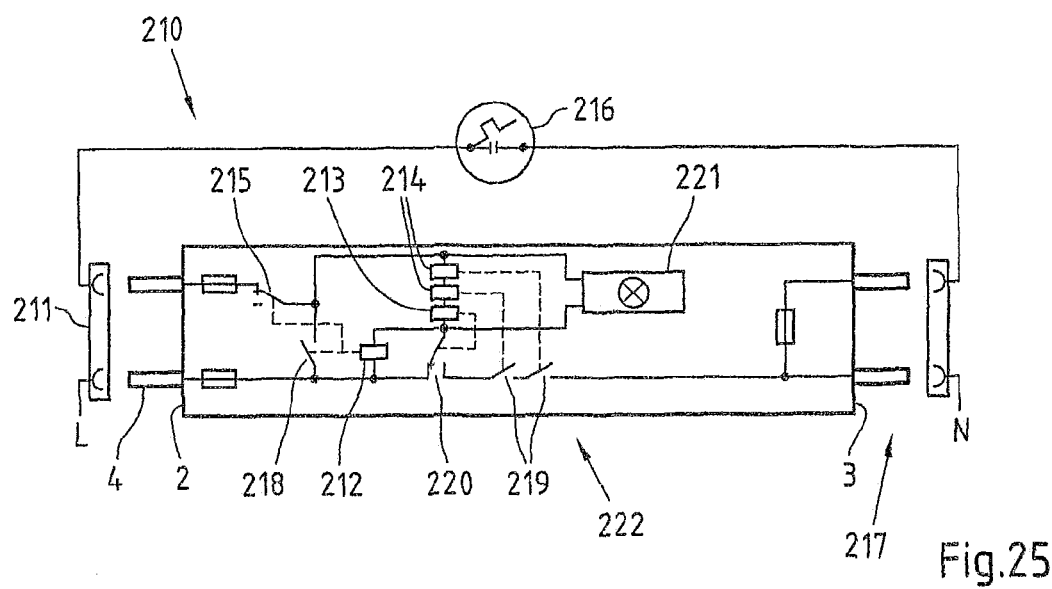

FIG. 25 shows a lamp 210, which represents another variant of the lamp 170 from FIG. 21. After insertion of the lamp 210 in a corresponding lampholder 211, the current path from the energized contact L via the contact 4, the sensor element 212, the sensor elements 213, 214, the switch 215, the starter 216 and the bridged contact module 217 of the opposite side to the earthed contact N is closed. Consequently, current flows through the sensor elements 212, 213, 214 and the switches 218, 219 close whereas switch 220 in the form of a two-way switch is reversed and switch 215 is opened. Now the current flows from the live contact L via switch 218, parallel via the light-emitting unit 221 and the sensor elements 213, 214, via switch 220 and switch 219 to the earthed contact N. Current still flows through the sensor element 212 and it remains locked.

Firstly via the switches 219 of the protective device 222, the contact modules 2, 3 are connected electrically via the lamp 210. As a result of the switches 219, 220 arranged in series, the dielectric strength, in the lamp shown and in this respect preferred, is increased to 3 kV.

It is not shown that the sensor elements 213, 214 can also be parallel, in particular in each case parallel to the light-emitting unit 221. A fuse is provided in the bridge of the right-hand contact module 217 to avoid a laterally intrinsic formation of parasitic voltages.

If the lamp 210 is inserted in upside-down orientation in the lampholder 211, a current path via the starter 216 will similarly be closed, as already described above. The sensor elements 213, 214 would then reverse switch 220 and close switch 219. In this installation position, compared to the installation position shown in FIG. 25, a smaller current flows through the sensor element 212, when the series-connected switches 220, 219 have closed the electrical contact to the right-hand contact module 3. The switches 215, 218 controlled via the sensor element 212 are therefore not actuated in this installation position. For reliably preventing a laterally intrinsic formation of parasitic voltages on the right-hand contact module 3, another fuse is provided there.

Figure 26:
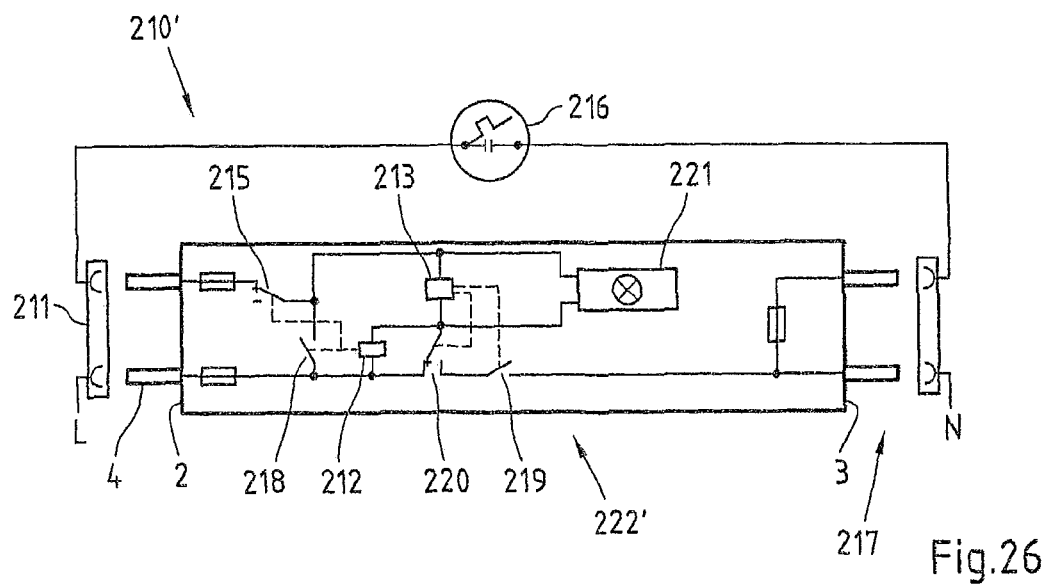

The lamp 210' shown in FIG. 26 is a variant of lamp 210 from FIG. 25. The basic function of the lamps 210, 210' with respect to protection against electric shock and of the protective devices 222, 222' provided for this is comparable. In the lamp 210' shown in FIG. 26, however, there is a saving of the switch 219 and the two sensor elements 214 of lamp 210 in FIG. 25. Depending on the choice of the other components of lamp 210', this can admittedly lead to a reduced dielectric strength of the protective device. This can, however, be counteracted by appropriate measures.

Independently of the question of the dielectric strength of the protective device, it can be tolerated with the lamp 210' shown in FIG. 26, that a switch 219, 220, 222', for example through frequent switching, remains permanently closed as a result of sticking of the corresponding contacts and even on removing the lamp 210' from the lampholder 211 it no longer returns to its original state. Even when this case arises, a further switch 219, 220 is provided, which is sufficient to bring the protective device 222' into an activated position, even if this is not identical to the original activated position of the protective device 222' without the sticking switch 219, 220. Basically it does not matter whether the switch 219 or the switch 220 that is in the form of a two-way switch remains stuck in its position, which the respective switch 219, 220 assumes with the protective device in the deactivated position 222'.

Figure 27:
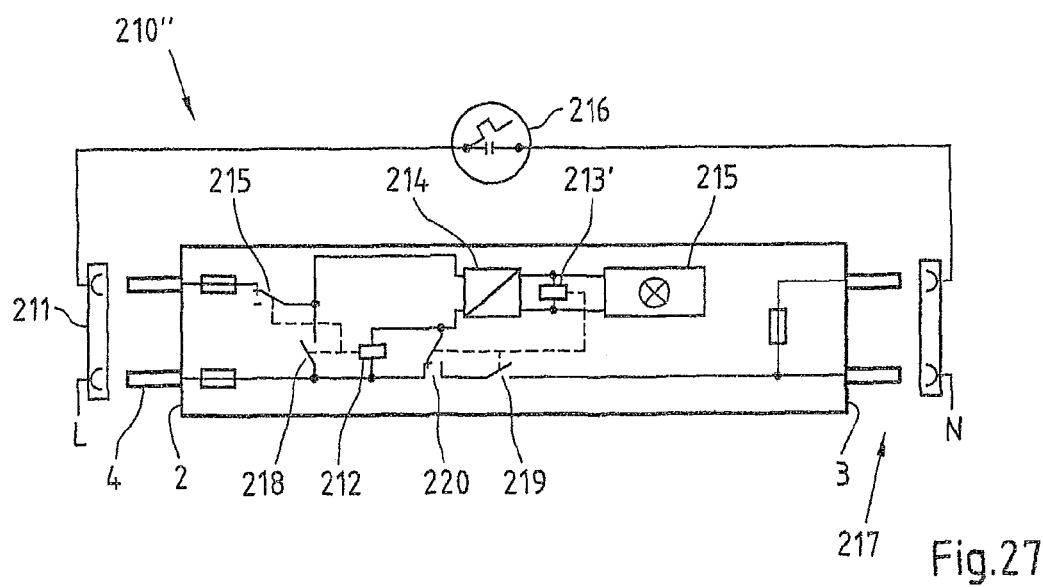

The lamp 210" shown in FIG. 27 is a variant of the lamp 210' from FIG. 26. In the lamp 210", the sensor element 213' is designed as part of a low-voltage relay and is followed by a driver system 214, which supplies current to the light-emitting LEDs 215. In this case it is a DC voltage, which is suitable and can be used for controlling the sensor element 213', without having to provide an additional ballast system for this. For simplicity, the driver system and the LEDs for lamp 210' in FIG. 26 are combined as the lamp 221.

The invention claimed is:

1. A lamp comprising a light-emitting unit, at least two separate contact modules and an electrical connection between the light-emitting unit and the contact modules, wherein each contact module has at least one electrical contact for connecting to a corresponding lampholder, wherein at least one protective device for prevention of electric shock is designed so that it can be deactivated electrically is provided on at least one of the electrical contacts in a partially assembled state of the lamp in a corresponding lampholder, wherein the protective device is designed to assume a deactivated position in the assembled state of the lamp and an activated position in the dismantled state of the lamp, and wherein the protective device has at least one electrically operable switch and at least one sensor element designed in the form of a relay.

2. The lamp according to claim 1, wherein the sensor element is provided in a primary circuit in such a way that the sensor element in the assembled state of the lamp has current flowing through it and thus closes the electrically operable switch.

3. The lamp according to claim 1, wherein a plurality of electrically operable switches are connected in series and can be closed by at least one sensor element.

4. The lamp according to claim 1, wherein the protective device has an automatically actuated reset mechanism during dismantling of the lamp for transferring the protective device to the activated position.

5. The lamp according to claim 2, wherein at least one relay is provided for locking the secondary circuit.

6. The lamp according to claim 1, wherein an electrically operable switch is provided between two contacts of a contact module and of the light-emitting unit to connect the light-emitting unit optionally with one of the two contacts of the contact module.

7. The lamp according to claim 1, wherein between two contacts of a contact module and the light-emitting unit, a polarity-reversing device is provided for reversing the polarity of the contacts of the one contact module relative to the light-emitting unit.

8. The lamp according to claim 7, wherein a sensor element is provided, which controls the polarity-reversing device in a predetermined, non-preferred interconnection of the lamp with the lampholder automatically for reversing the polarity of the contacts of the one contact segment relative to the light-emitting unit.

9. The lamp according to claim 7, wherein an externally accessible, mechanically operable tripping mechanism is provided for actuating the polarity-reversing device.

10. The lamp according to claim 1, wherein a signal generator is provided and wherein the signal generator is arranged so that the signal generator is active with a predetermined, non-preferred interconnection of the lamp or with a predetermined preferred interconnection of the lamp or a predetermined preferred interconnection of the lamp with the lampholder.

11. The lamp according to claim 10, wherein the signal generator is coupled to a sensor element and a switching unit, so that in a predetermined operating state, the sensor element controls the switching unit for activation of the signal generator.

12. The lamp according to claim 11, wherein the switching unit coupled to the signal generator is of resettable design, is coupled to a resetter, or both, for resetting the switching unit.

13. The lamp according to claim 1, wherein at least one sensor element is arranged so that, with a first predetermined interconnection of the lamp with the lampholder of the luminaire it leads to a power loss and with a second predetermined interconnection of the lamp with the lampholder of the luminaire it leads to no or a smaller power loss, and wherein a signal generator is arranged so that it is active in the first predetermined interconnection or in the second predetermined interconnection or the second predetermined interconnection.

14. The lamp according to claim 1, wherein the protective device is designed so that in the partially assembled state, the contact voltage on an electrical contact assigned to the protective device is below a value of 50 V (AC) and/or 120 V (DC).

15. The lamp according to claim 1, wherein the lamp is of tubular design.

16. A system comprising a lamp and a lampholder, wherein the lamp for operation in the lampholder is designed corresponding to the lampholder, wherein the lamp is configured according to claim 1 and wherein the protective device in the state of the lamp assembled in the lampholder is forcibly deactivated, and in the dismantled state is activated.

17. The system according to claim 16, wherein the lampholder of the luminaire is suitable for operation with fluorescent tubes.

18. A lamp comprising a light-emitting unit, at least two separate contact modules and an electrical connection between the light-emitting unit and the contact modules, wherein each contact module has at least one electrical contact for connecting to a corresponding lampholder, wherein at least one protective device for prevention of electric shock is designed so that it can be deactivated electrically is provided on at least one of the electrical contacts in a partially assembled state of the lamp in a corresponding lampholder, wherein the protective device is designed to assume a deactivated position in the assembled state of the lamp and an activated position in the dismantled state of the lamp, wherein at least one measuring device is provided for determining the voltage drop between at least two contacts of the lamp, and wherein at least one switch is provided for interconnection of at least one contact with the light-emitting unit as a function of the voltage drop found.

19. The lamp according to claim 18, wherein the at least one switch is an electrically operable switch, and wherein the measuring device and the switch are coupled so that the switch is switched automatically depending on the voltage drop found.

* * * * *